(12) United States Patent
Irish et al.

(10) Patent No.: US 10,495,464 B2
(45) Date of Patent: Dec. 3, 2019

(54) SYSTEMS AND METHODS FOR GNSS SNR PROBABILISTIC LOCALIZATION AND 3-D MAPPING

(71) Applicant: The Regents of the University of California, Oakland, CA (US)

(72) Inventors: Andrew T. Irish, San Diego, CA (US); Jason T. Isaacs, Santa Barbara, CA (US); Francois Quitin, Brussels (BE); Joao P. Hespanha, Santa Barbara, CA (US); Upamanyu Madhow, Santa Barbara, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 163 days.

(21) Appl. No.: 15/038,702

(22) PCT Filed: Dec. 2, 2014

(86) PCT No.: PCT/US2014/068220
§ 371 (c)(1),
(2) Date: May 23, 2016

(87) PCT Pub. No.: WO2015/126499
PCT Pub. Date: Aug. 27, 2015

(65) Prior Publication Data
US 2016/0290805 A1 Oct. 6, 2016

Related U.S. Application Data

(60) Provisional application No. 61/910,866, filed on Dec. 2, 2013.

(51) Int. Cl.
*G01C 21/00* (2006.01)
*G01S 19/22* (2010.01)

(52) U.S. Cl.
CPC ............ *G01C 21/005* (2013.01); *G01S 19/22* (2013.01)

(58) Field of Classification Search
CPC ..... G01C 21/005; G01S 19/22; G01S 13/003; G01S 19/18; G01S 19/29; G01S 19/30
(Continued)

(56) References Cited

U.S. PATENT DOCUMENTS

| 4,949,268 A | * | 8/1990 | Nishikawa | ............. G01C 21/28 340/995.1 |
| 6,900,758 B1 | | 5/2005 | Mann et al. | |

(Continued)

FOREIGN PATENT DOCUMENTS

| WO | 2014150961 A1 | 9/2014 |
| WO | 2015126499 | 8/2015 |
| WO | WO-20150126499 A2 | 8/2015 |

OTHER PUBLICATIONS

Segura, UWB localization and SLAM, Jan. 26, 2011, MDPI, 10.3390/s110202035, p. 2.*
(Continued)

*Primary Examiner* — Harry K Liu
(74) *Attorney, Agent, or Firm* — Billion & Armitage; Michael A. Collins

(57) ABSTRACT

Various embodiments each include at least one of systems, methods, devices, and software for GNSS simultaneous localization and mapping (SLAM). The disclosed techniques demonstrate that simultaneous localization and mapping (SLAM) can be performed using only GNSS SNR and geo-location data, collectively termed GNSS data henceforth. A principled Bayesian approach for doing so is disclosed. A 3-D environment map is decomposed into a grid of binary-state cells (occupancy grid) and the receiver locations are approximated by sets of particles. Using a large number of sparsely sampled GNSS SNR measurements and (Continued)

receiver/satellite coordinates (all available from off-the-shelf GNSS receivers), likelihoods of blockage are associated with every receiver-to-satellite beam. Loopy Belief Propagation is used to estimate the probabilities of each cell being occupied or empty, along with the probability of the particles for each receiver location.

17 Claims, 26 Drawing Sheets

(58) Field of Classification Search
USPC .................................................. 342/357.61
See application file for complete search history.

(56) References Cited

U.S. PATENT DOCUMENTS

| | | | |
|---|---|---|---|
| 2004/0190637 | A1 | 9/2004 | Maltsev |
| 2005/0232338 | A1 | 10/2005 | Ziedan |
| 2005/0234679 | A1 | 10/2005 | Karlsson |
| 2006/0106533 | A1 | 5/2006 | Hirokawa |
| 2008/0033645 | A1 | 2/2008 | Levinson et al. |
| 2008/0232434 | A1 | 9/2008 | Yang |
| 2010/0194634 | A1 | 8/2010 | Biacs |
| 2011/0102545 | A1* | 5/2011 | Krishnaswamy ...... G01C 21/12 348/46 |
| 2011/0153198 | A1* | 6/2011 | Kokkas .............. G01C 21/3638 701/533 |
| 2012/0035437 | A1* | 2/2012 | Ferren .................... A61B 1/041 600/302 |
| 2012/0044104 | A1 | 2/2012 | Schloetzer |
| 2012/0159408 | A1 | 6/2012 | Hershey et al. |
| 2012/0245844 | A1* | 9/2012 | Lommel ................ G01C 21/00 701/448 |
| 2012/0249368 | A1 | 10/2012 | Youssef et al. |
| 2012/0289243 | A1 | 11/2012 | Tarlow et al. |
| 2013/0080045 | A1 | 3/2013 | Ma et al. |
| 2013/0131985 | A1* | 5/2013 | Weiland ................ G01C 21/20 701/516 |
| 2013/0278466 | A1 | 10/2013 | Owen |
| 2013/0285849 | A1 | 10/2013 | Ben-Moshe et al. |
| 2013/0332065 | A1* | 12/2013 | Hakim .................. H04W 64/00 704/411 |
| 2014/0015529 | A1* | 1/2014 | Bottomley ............ G01R 33/485 324/309 |
| 2014/0062777 | A1 | 3/2014 | MacGougan |
| 2015/0031390 | A1* | 1/2015 | Robertson ............ G01C 21/165 455/456.1 |
| 2015/0039154 | A1 | 2/2015 | Bhardwaj |
| 2015/0086084 | A1* | 3/2015 | Falconer ............ G06K 9/00979 382/113 |
| 2015/0309183 | A1 | 10/2015 | Black |
| 2015/0319729 | A1* | 11/2015 | MacGougan ......... H04W 4/023 455/456.1 |
| 2016/0062949 | A1 | 3/2016 | Smith |
| 2016/0290805 | A1 | 10/2016 | Irish et al. |

OTHER PUBLICATIONS

International Application Serial No. PCT/US2014/068220, International Preliminary Report on Patentability dated Jun. 16, 2016, 9 pgs.
International Application Serial No. PCT/US2014/068220, International Search Report dated Aug. 21, 2015, 3 pgs.
International Application Serial No. PCTIUS2014/068220, Written Opinion dated Aug. 21, 2015, 7 pgs.
"International Search Report and Written Opinion issued in PCT Application No. PCT/US2016/042588, dated Apr. 13, 2017, 15 pp.".
Abdi, et al., "A New Simple Model for Land Mobile Satellite Channels: First- and Second-Order Statistics", IEEE Transactions on Wireless Communications, vol. 2, No. 3, 519-528, May 2003.
Abdi, et al., "On the Estimation of the K Parameter for the Rice Fading Distribution", IEEE Communications Letters, vol. 5, No. 3, 92-94 Mar. 2001.
Arulampalam, et al., "A Tutorial on Particle Filters for Online Nonlinear/Non-Gaussian Bayesian Tracking", IEEE Transactions on Signal Processing, vol. 50, No. 2, 174-188, Feb. 2002.
Ben-Moshe, et al., "Improving Accuracy of GNSS Devices in Urban Canyons", CCCG 2011, Toronto ON, Aug. 10-12, 2011.
Bryson, et al., Estimation using sampled data containing sequentially correlated noise. Journal of Spacecraft and Rockets, 5(6):662-665, 1968.
Groves, "Shadow Matching: A New GNSS Positioning Technique for Urban Canyons", The Journal of Navigation (2011), 64, 417-430.
Hsu, "NLOS Correction/Exclusion for GNSS Measurement Using RAIM and City Building Models", Sensors 2015, 15, Jul. 17, 2015, 17329-17349.
Ihler, et al., Efficient multiscale sampling from products of Gaussian mixtures. Advances in Neural Information Processing Systems, 16:1-8, 2004.
Isaacs, et al., "Bayesian Localization and Mapping Using GNSS SNR Measurements", Jul. 10, 2014, 445-451.
Kaplan, et aL, Understanding GPS: Principles and Applications. Artech House, second edition, 2005.
Kim, et aL, Localization and 3D reconstruction of urban scenes using GPS. In Proc. Of IEEE International Symposium on Wearable Computers., pp. 11-14, 2008.
Li, et al., Survey of maneuvering target tracking. part i. dynamic models. IEEE Trans. On Aerospace and Electronic Systems, 39(4): 1333-1364, 2003.
Loo, A statistical model for a land mobile satellite link. IEEE Trans. On Vehicular Technology, 34(3):122-127, 1985.
Petersen, et al., The matrix cookbook. Technical University of Denmark, 7:15, 2008.
Peyraud, et al., "About Non-Line-Of-Sight Satellite Detection and Exclusion in a 3D Map-Aided Localization Algorithm", Sensors 2013, 13, Jan. 11, 2013, 829-847.
Wang, 'Kinematic GNSS Shadow Matching Using Particle Filters', In: Proceedings of the 27th International Technical Meeting of the Satellite Division of the Institute of Navigation (ION GNSS+ 2014), 2014, Tampa, Florida, pp. 1907-1919., 2014.
Non-Final Office Action for U.S. Appl. No. 15/211,808 dated Feb. 4, 2019.
"EP Partial Search Report for 16852235.7-1206/3326005 PCT/US2016/042588, dated Feb. 13, 2019".
Saunders, et al., "A physical-statistical model for land mobile satellite propagation in built-up areas", 10th International Conference on Antennas and Propagation, Conference Ppublication No. 436, IEE 1997, Apr. 14-17, 1997.
Yozevitch, et al., "A robust shadow m atching algorithm for GNSS Positioning", Navigation: Journal of the Institute of Navigation, Institute of Navigation, Fairfax, VA, US, vol. 62, No. 2, Jun. 1, 2015, 95-101.
Han, et al., "Kernal-Based Bayesian Filtering for Object Tracking", Proceedings 2005 IEEE Computer Society Conference on Computer Vision and Pattern Recognition, CVPR 2005:20-25, San Diego, CA, IEEE Piscataway, NJ, USA, vol. 1, (Jun. 20, 2005), pp. 227-234, XP010817436, DOI: 10.1109/CVPR.2005.199, ISBN 978-0-7695-2372-9.
Extended European Search Report for Application No. 16852235.7-1206/3326005 PCT/US2016/042588, Jul. 18, 2019, 1-17.

\* cited by examiner

SYSTEMS AND METHODS FOR GNSS SNR PROBABILISTIC LOCALIZATION AND 3-D MAPPING

RELATED APPLICATION AND PRIORITY CLAIM

This application is a U.S. National Stage Filing under 35 U.S.C. 371 from International Application No. PCT/US2014/068220, filed on Dec. 2, 2014, and published as WO 2015/126499 A2 on Aug. 27, 2015, which is related and claims priority to U.S. Provisional Application No. 61/910,866, filed on Dec. 2, 2013 and entitled "PROBABILISTIC LOCALIZATION AND 3-D MAPPING BASED ON GNSS SNR MEASUREMENTS," the entirety of each of which is incorporated herein by reference.

STATEMENT OF GOVERNMENT SPONSORED SUPPORT

The subject matter here was developed with Government support under Grant (or Contract) No. W911NF-09-D-0001 awarded by the U.S. Army Research Office. The Government has rights to the subject matter herein.

BACKGROUND INFORMATION

Global Navigation Satellite Systems (GNSS), such as GPS, are often used for geo-localization and navigation. These GNSS systems (e.g., Galileo, GLONASS, Beidou) consist of constellations of satellites in space, with each satellite wirelessly broadcasting signals containing information so that corresponding earth-based receivers can determine their geo-location. The use of GNSS has become ubiquitous with the advent of consumer mobile electronic devices. Several satellite systems have been deployed in recent years, resulting in multiple GNSS satellite constellations. As more GNSS receivers become capable of interacting with each of these satellite systems, the application of the systems and methods proposed herein will only be enhanced. However, GNSS localization quality is often degraded. This degradation is especially prevalent in urban areas, including signal blockage and multi-path reflections from buildings, trees, terrain, and other obstacles.

The disclosed techniques demonstrate that simultaneous localization and mapping (SLAM) can be performed using only GNSS SNR and geo-location data, collectively termed GNSS data henceforth. A principled Bayesian approach for doing so is disclosed, but alternative approaches at varying degrees of complexity and accuracy may be employed by one skilled in the art.

In GNSS and other wireless communication, line-of-sight (LOS) channels are characterized by statistically higher received power levels than those in which the LOS signal component is blocked (e.g., non-LOS or NLOS channels). As a mobile GNSS receiver traverses an area, obstacles (e.g., buildings, trees, terrain) frequently block the LOS component of different satellite signals, resulting in NLOS channels characterized by statistically lower signal-to-noise ratios (SNR). Many GNSS receivers can also log the transmitted or computed geo-location data, including per-satellite azimuth/elevation, SNR, and the latitude/longitude of the receiver.

In addition to GNSS localization, three-dimensional (e.g., 3-D) maps of urban environments are of tremendous importance for several types of commercial applications. However, existing methods for 3-D mapping of city environments are expensive or necessitate significant planning and surveying, such as using LiDAR surveying or aerial photography surveying.

Due to growing demand for accurate geo-location services and the fact that GNSS positioning accuracy degrades in cluttered urban environments, existing mapping solutions have focused on refining position estimates by using known 3-D environment maps. In some embodiments, "shadow matching" (SM) may improve localization. Essentially, SM involves detecting occluded signals and matching the corresponding points of reception to areas inside the "shadows" of the signal-blocking buildings, thereby constraining the space of possible receiver locations. SM may be implicitly performed by first learning and then matching against SNR measurement models, where the models may vary as a function of the receiver coordinates, and where the LOS/NLOS channel conditions are modeled probabilistically.

Using GNSS signal strength to construct 3-D environment maps is a relatively new area of research. Generally, GNSS-derived information is used to identify shadows of buildings with respect to different satellite configurations (as in SM), after which ray-tracing methods may be used to build environment maps. However, existing methods rely on a collection of heuristics resulting in "hard" maps, with no notion of map uncertainty and no straightforward way to update the map in a principled, consistent manner when additional measurements become available.

Due to the complexity of mapping problems, some existing solutions rely on probabilistic techniques to estimate maps. For applications focusing on the mapping of urban landscapes, some form of obstacle detection is typically used. This may use sensors, such as LiDAR mounted on the sensing vehicle, that take obstacle-range readings in chosen directions but with respect to a local reference frame. Without correction, such active mapping techniques can be plagued by self-localization errors (e.g., position/velocity errors, orientation errors), leading to a data association problem. As a result, some approaches employ a class of algorithms known as simultaneous localization and mapping (SLAM) to estimate the map and localize the sensing vehicle jointly. What is needed in the art is a localization approach that reduces the effects of localization errors.

DETAILED DESCRIPTION

Figure 1:
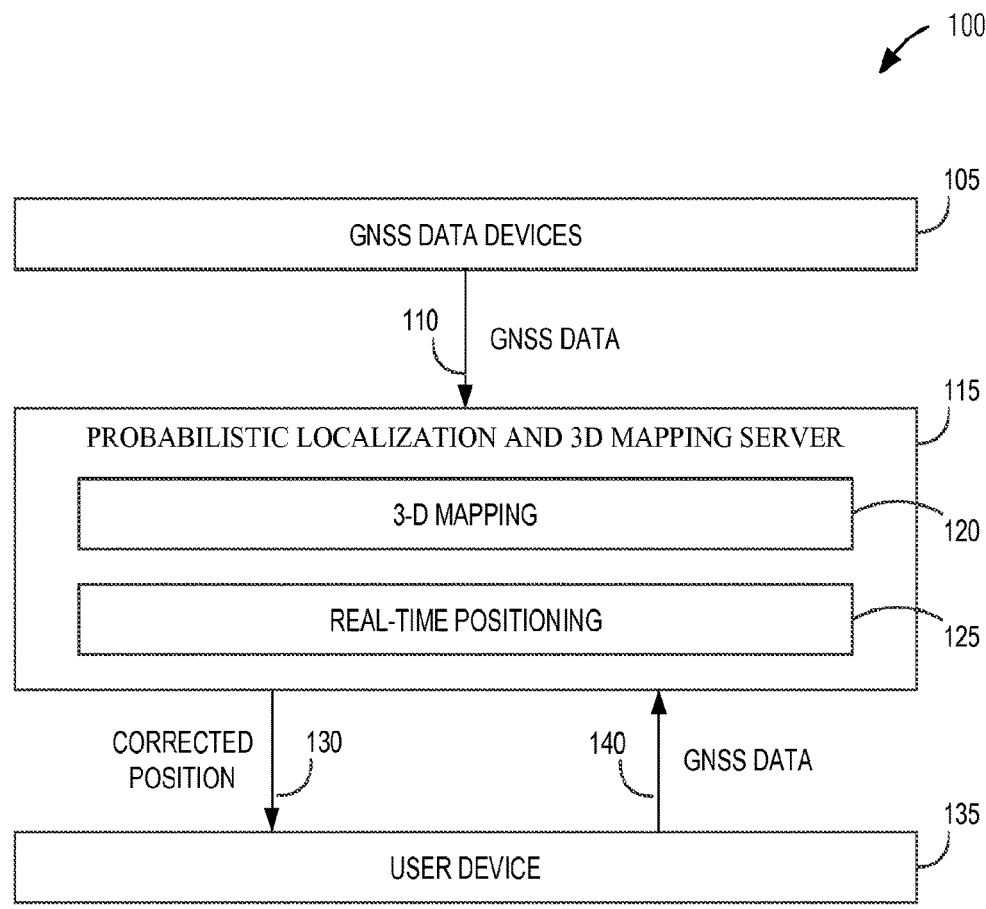
FIG. 1 shows an example probabilistic localization and 3-D mapping system, according to an example embodiment.

In the following detailed description of systems and methods for GNSS SNR probabilistic localization and 3-D mapping, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be used and that structural, logical, and electrical changes may be made without departing from the scope of the inventive subject matter. Such embodiments of the inventive subject matter may be referred to, individually and/or collectively, herein by the term "invention" or "subject matter" merely for convenience and without intending to limit the scope of this application voluntarily to any single invention or inventive concept if more than one is in fact disclosed. The following description is, therefore, not to be taken in a limited sense, and the scope of the inventive subject matter is defined by the appended claims.

Using only GNSS SNR and geo-location data, a coarse 3-D map of an unknown region may be estimated in a principled Bayesian manner. The present subject matter includes two primary elements. First, using a physically inspired sensor model, GNSS signal "rays" from various receiver positions to different satellites can be assigned likelihoods of being LOS/NLOS. Second, these rays can be stitched together via Belief Propagation to form a probabilistic map.

To highlight the efficiency of this system and method, the following detailed description describes how the computational complexity scales linearly in the number of measurements and size of the unknown region. This linear scaling enables this to be used in online and offline mapping scenarios. For real-time processing, the incremental complexity of map updates is reduced.

The functions or algorithms described herein may be implemented in hardware, software, or a combination of software and hardware. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, a mobile device, server, a router, or other device capable of processing data including network interconnection devices. Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 shows an example probabilistic localization and 3-D mapping system 100, according to an embodiment. System 100 may include multiple GNSS data devices 105. GNSS data devices 105 may include any mobile devices capable of providing GNSS data, including tablets, smart phones, smart watches, vehicular navigation systems, and other devices. GNSS data devices 105 may provide GNSS data 110 to a probabilistic localization and 3-D mapping server 115. GNSS data 110 may include information logged by GNSS receivers. This information includes T receiver position fixes $x=\{x_t\}^T_{t=1}$, where $x_t$ is the reported latitude and longitude at time t. In addition the receiver reports satellite SNR measurements, which consist of T vectors, $z=\{z_t\}^T_{t=1}$, where $z_t=[z_{t,1}, \ldots, z_{t,N_t}]$ contains individual SNR readings and $N_t$ is the number of satellites in view at measurement index $_t$. Together with individual SNR readings, the receivers may provide satellite identifiers or satellite elevations and azimuths $[\theta_{t,n}, \varphi_{t,n}]$, which we consider noiseless. Alternatively, the satellite identifiers, satellite elevations, and satellite azimuths may be received from an external source, such as from JPL or another source. Throughout this document, because various equations may be directed to probabilistic variables, the equations may not include noiseless satellite identifiers, satellite elevations, satellite azimuths, or other noiseless (e.g., non-probabilistic) information.

GNSS data devices 105 may provide GNSS data 110 to a probabilistic localization and 3-D mapping server 115, which may include a 3-D mapping module 120 and a real-time positioning module 125. Server 115 may reside on a smartphone, on an internet-based (e.g. cloud-based) server, on a desktop computer, or on any other mobile or stationary computing device. Server 115 may provide a corrected position 130 to a user device 135, where the corrected position 130 may be calculated using either or both of the 3-D mapping module 120 and real-time positioning module 125. For example, the user device 135 may provide GNSS data 140 to the server 115, the server may use the provided GNSS data within the 3-D mapping module 120 to update a 3-D map, and the server may generate an updated corrected position 130 using the real-time positioning module 125.

The 3-D maps generated by this mapping system 100 may be used to increase the accuracy of GNSS (e.g., GPS) location estimation of mobile devices. Such a mapping system 100 may be used to improve localization of mobile devices as part of the mobile OS or mobile apps that provide 3-D maps. Such a mapping system 100 may be used to generate 3-D maps for use in simulation and prediction of wireless coverage by wireless telecommunication operators. The 3-D maps may also be used as input for simulation environments for flight simulators, 3-D video games, military mission planning, or other mapping and localization applications.

Figure 2:
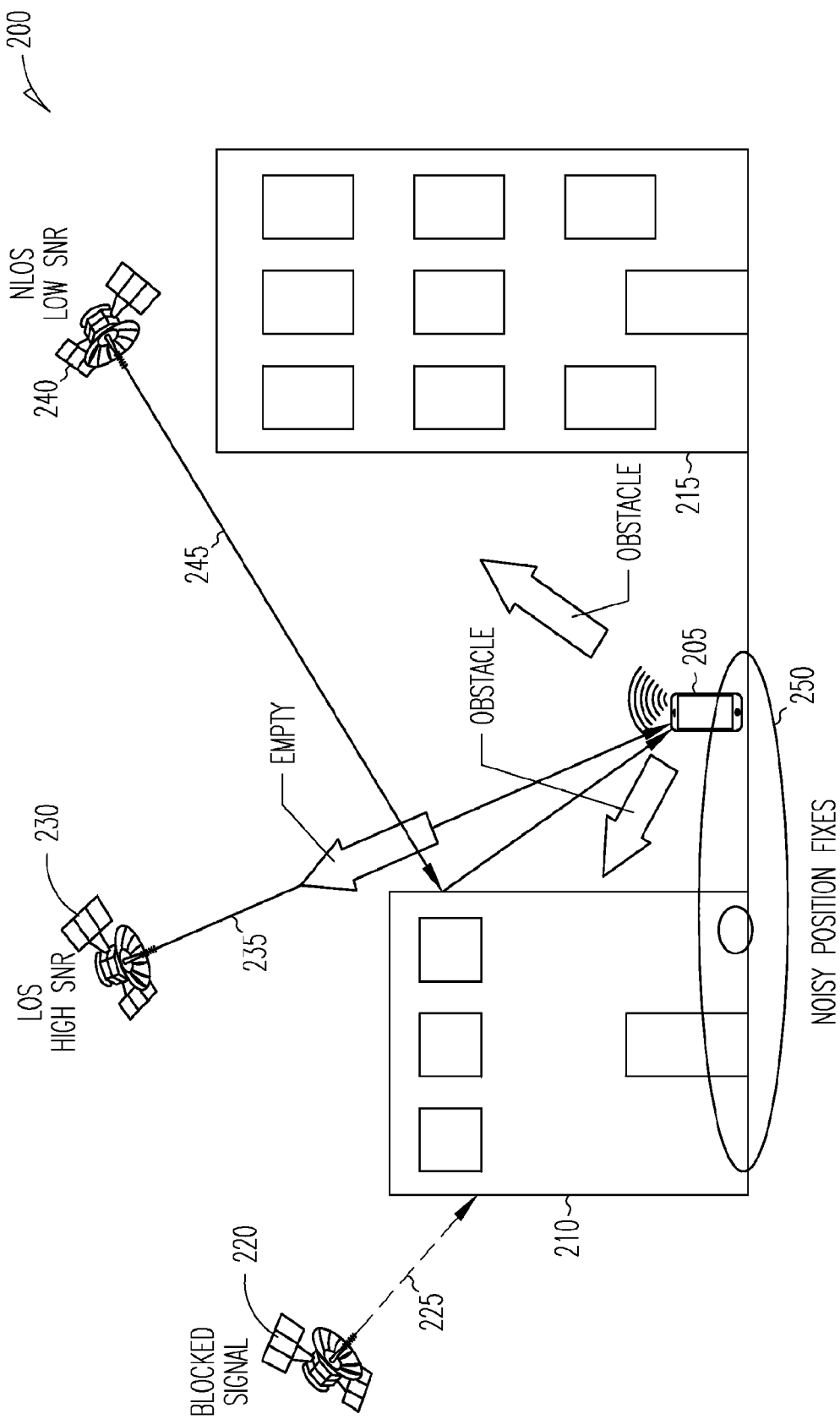
FIG. 2 shows a block diagram of urban GNSS signal degradation, according to an example embodiment.

FIG. 2 shows a block diagram of urban GNSS signal degradation 200, according to an embodiment. GNSS localization quality is often degraded due to signal blockage and multi-path reflections. As shown in FIG. 2, a mobile device 205 may be located in an urban environment, where the urban environment may include two nearby buildings 210 and 215. Satellite 220 may be on the opposite side of building 210 from the mobile device 205, and building 210 may block the signal 225 from GNSS satellite 220. Satellite 230 may have a direct line-of-sight (LOS) to the mobile device 205, where the direct LOS allows satellite 230 to transmit a direct LOS GNSS signal 235 with a high signal-to-noise ratio (SNR). Satellite 240 may be positioned such that building 215 blocks a LOS GNSS signal from satellite 240. Satellite 240 may be positioned such that building 210 reflects the GNSS signal and results in a non-line-of-sight (NLOS) GNSS signal path 245 (e.g., multipath reflection) to the mobile device 205. Because the building 210 is an imperfect signal reflector, and because the length of the NLOS GNSS signal path 245 (e.g., pseudo range measurement) can be significantly longer than the LOS path (true range), the received multipath NLOS GNSS signal is usually lower in power and results in a large localization uncertainty. When several GNSS signals are blocked by buildings, the remaining unblocked GNSS satellites are typically in a poor geometry for localization. This may result in a noisy horizontal position fix 235 (e.g., high horizontal dilution of precision). An NLOS can be characterized by a statistically lower SNR than a LOS signal. By observing SNR measurements, the existence of NLOS/LOS channels and nearby obstacles can be inferred in various directions relative to the satellite locations and geo-location of the mobile device 205. For example, using a large set of GNSS SNR measurements and receiver and satellite coordinates, likelihoods of blockage are associated with every receiver-to-satellite ray. The GNSS SNR data may come from any of various sources, including crowd-sourced data from multiple GNSS receivers or from a single GNSS receiver. By fusing information from multiple receiver locations and multiple satellites, it becomes possible to determine the geo-location of obstacles, such as shown and described with respect to FIG. 3.

Figure 3:
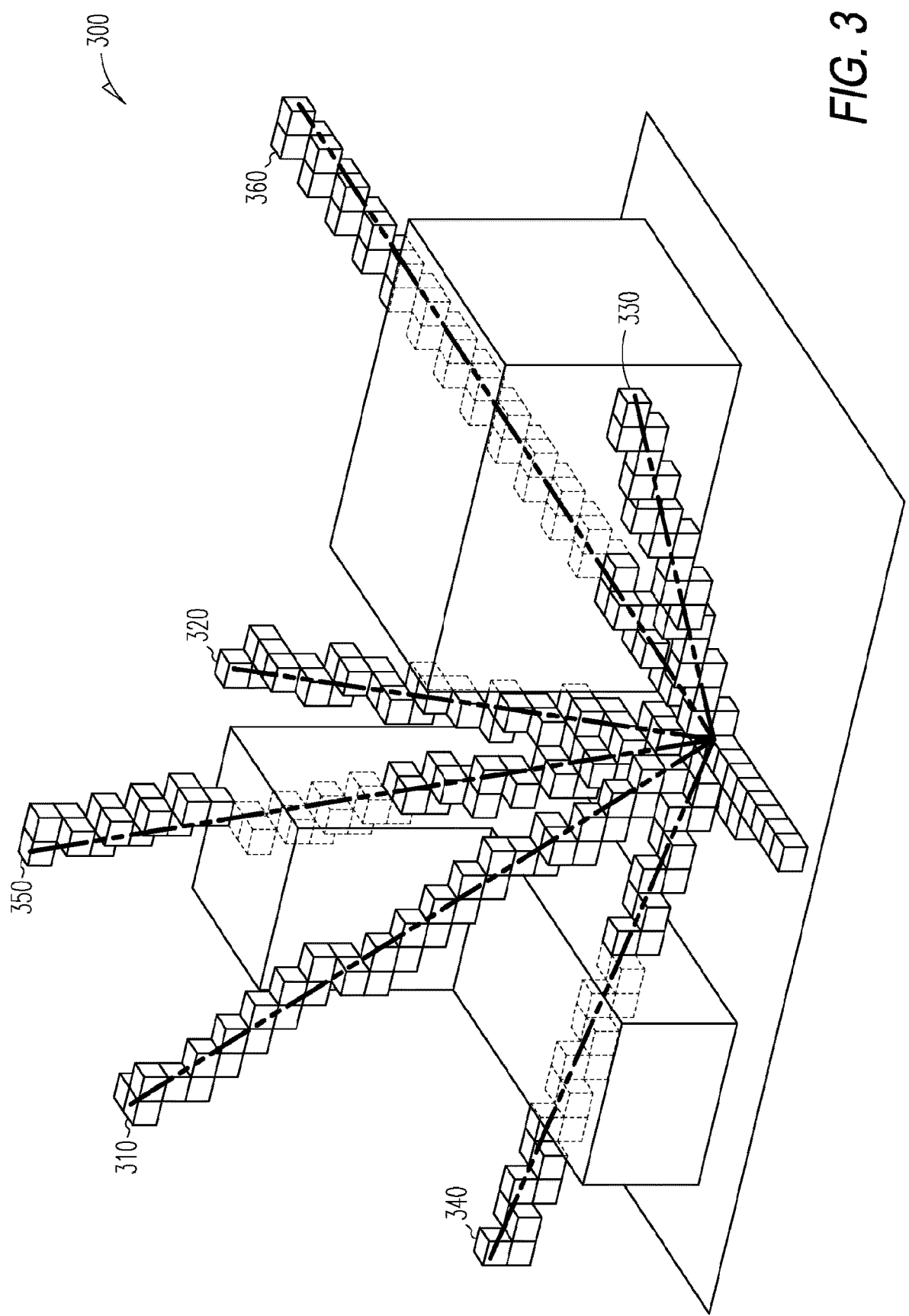
FIG. 3 shows a SNR measurement scenario with occupancy grid illustration, according to an example embodiment.

FIG. 3 shows a SNR measurement scenario with occupancy grid illustration 300, according to an embodiment. To make the problem tractable, the region of interest is partitioned into a 3-D arrangement of cells (e.g., volumetric pixels, voxels), and the mapping problem is formulated as computing the occupancy probabilities of each cell in the occupancy grid. This quantizes the measurement rays to cells along the 3-D grid, as illustrated in FIG. 3. As shown in FIG. 3, SNR measurement rays are shown as signal paths to various satellites. LOS rays may trace through multiple cells that represent empty space, such as rays 310, 320, and 330. NLOS rays may trace through multiple cells that represent empty space and cells that represent occupied space, such as rays 340, 350, and 350. The NLOS rays may correspond to signals that are characterized by statistically lower SNR values.

After defining the GNSS-SNR measurement model, a sparse graphical model describing the dependencies between the occupancy grid and SNR measurements is constructed. This model is then used to represent the posterior probability distribution of the map and receiver locations within a factor graph. Loopy Belief Propagation (LBP) may be applied to the factor graph to estimate efficiently the probabilities of each cell being occupied or empty, and to estimate the probability of hypothesized receiver locations. By using the factor graph with Loopy Belief Propagation approach, the present subject matter can compute the full map posterior and geo-location estimates in one batch operation. Application of the Loopy Belief Propagation algorithm to provide estimated probabilities of cell occupancy is described below with respect to FIG. 4.

Figure 4:
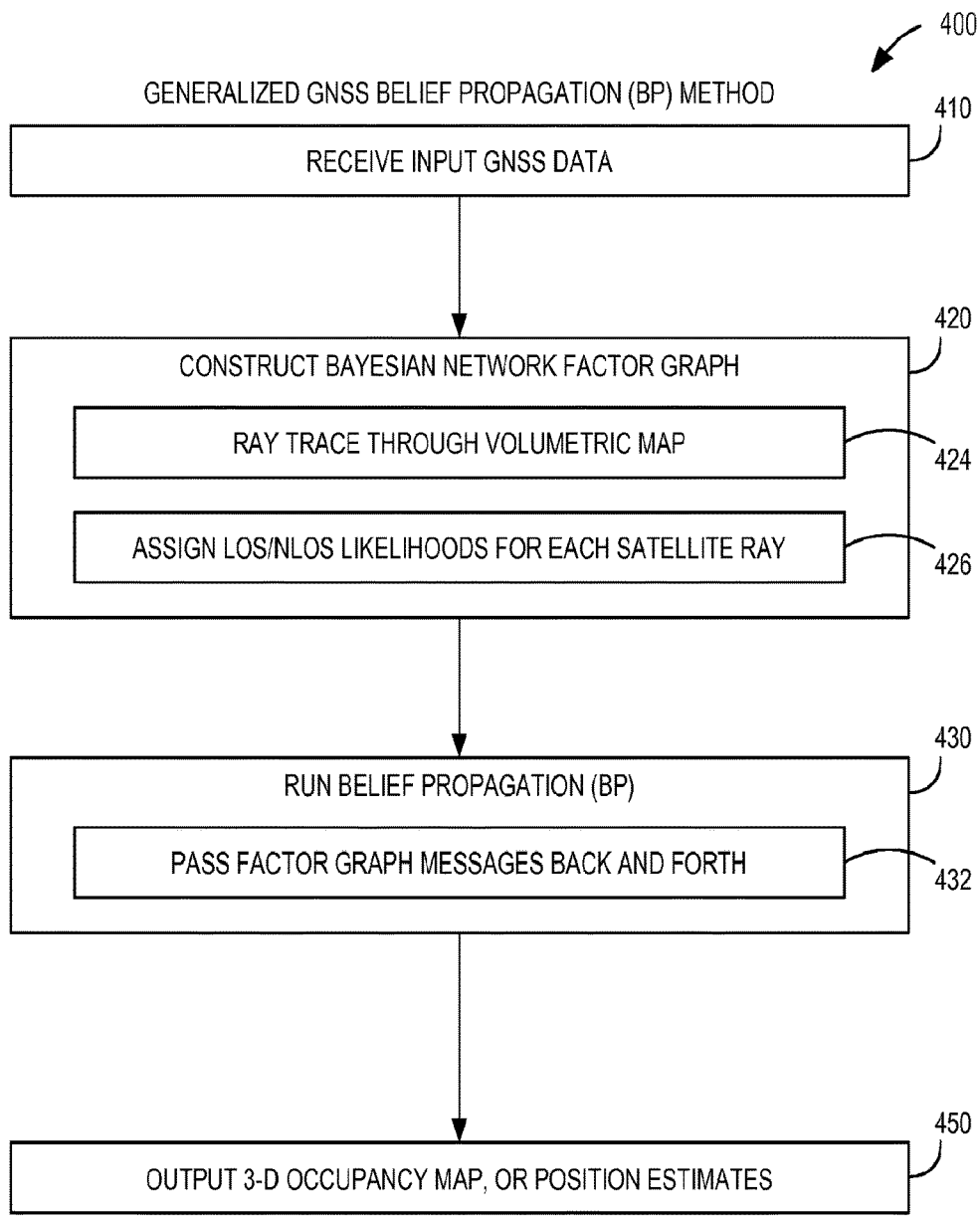
FIG. 4 shows a generalized GNSS belief propagation (BP) method 400, according to an example embodiment.

FIG. 4 shows a generalized GNSS belief propagation (BP) method 400, according to an embodiment. Method 400 may begin with receiving 410 input GNSS data. Receiving 410 input GNSS data may include receiving an estimated user position, such as a latitude and longitude. Receiving the estimated user position may include receiving an estimated user position calculated by an external GNSS device, or may include receiving raw GNSS information and calculating an estimated user position. The estimated user position may include a combination of location information, such as provided by GNSS location information, Wi-Fi positioning, cellular data triangulation, or other location information. Receiving 410 input GNSS data may include may also include receiving satellite coordinates or receiving observed SNR measurements. Receiving predicted satellite locations may include receiving calculated satellite locations, or may include receiving raw satellite location information (e.g., almanac, ephemeris) and calculating an estimated user position.

Method 400 may include constructing 420 a Bayesian network factor graph. The network factor graph may include multiple SNR measurement factor nodes and multiple voxel occupation probability nodes, as shown and described below with respect to FIGS. 8, 15, and 21. Constructing 420 the Bayesian network factor graph may include ray-tracing 424 multiple rays through multiple voxels within a volumetric map. Each of the rays may represent a GNSS satellite ray from a GNSS receiver position to each of multiple GNSS satellites. Constructing 420 the Bayesian network factor graph may also include storing multiple occupancy probabilities associated with each of the voxels within the volumetric map, each of the occupancy probabilities indicating a likelihood that each of the voxels is occupied by an obstruction. Constructing 420 the Bayesian network factor graph may also include assigning (e.g., associating) 426 a line-of-sight/non-line-of-sight (LOS/NLOS) probability with each of the rays.

Method 400 may include running 430 belief propagation (BP). Running 430 belief propagation may include passing 432 messages between Bayesian network factor graph nodes. The Bayesian network factor graph nodes may include multiple map state variable nodes and multiple SNR likelihood factor nodes, and running 430 belief propagation may include passing 432 messages between the map state variable nodes and the SNR likelihood factor nodes. Passing 432 messages may be conducted according to a message passing schedule, where the schedule may be synchronous or asynchronous. Method 400 may include outputting 440 a 3-D occupancy map, a time sequence of position, or both.

Elements within method 400 may be executed on a mobile device (e.g., handheld computer, tablet, smartphone, smartwatch), or may be executed on a stationary device (e.g., desktop computer, server), such as the device shown and described below with respect to FIG. 26. The generalized GNSS belief propagation (BP) method 400 may be modified to include various additional method steps, such as shown and described below with respect to FIG. 7, 14, 20, or 22. For example, additional method steps may include using map prior information to initialize (e.g., seed or hot start) the map. Additional method steps may include updating or rerunning with additional data, which may extend method 400 to both batch operation and repeating (e.g., continuous) data processing. Similarly, for BP-based methods, additional method steps may include rebuilding graph and rerunning BP 430, or resampling position particle sets around output estimates and rebuilding 420 the factor graph and rerunning BP 430.

Receiving 410 input GNSS data may vary according to implementation. For example, receiving 410 input GNSS data may include receiving position input and uncertainty, where these inputs may be an output of a GNSS device or a fused output, such as a combination of Wi-Fi and GPS locations. Additional method steps may include adjusting map resolution, such as for non-uniform voxel sizes. Similarly, additional method steps may include dynamic voxel size adjustment.

Figure 5:
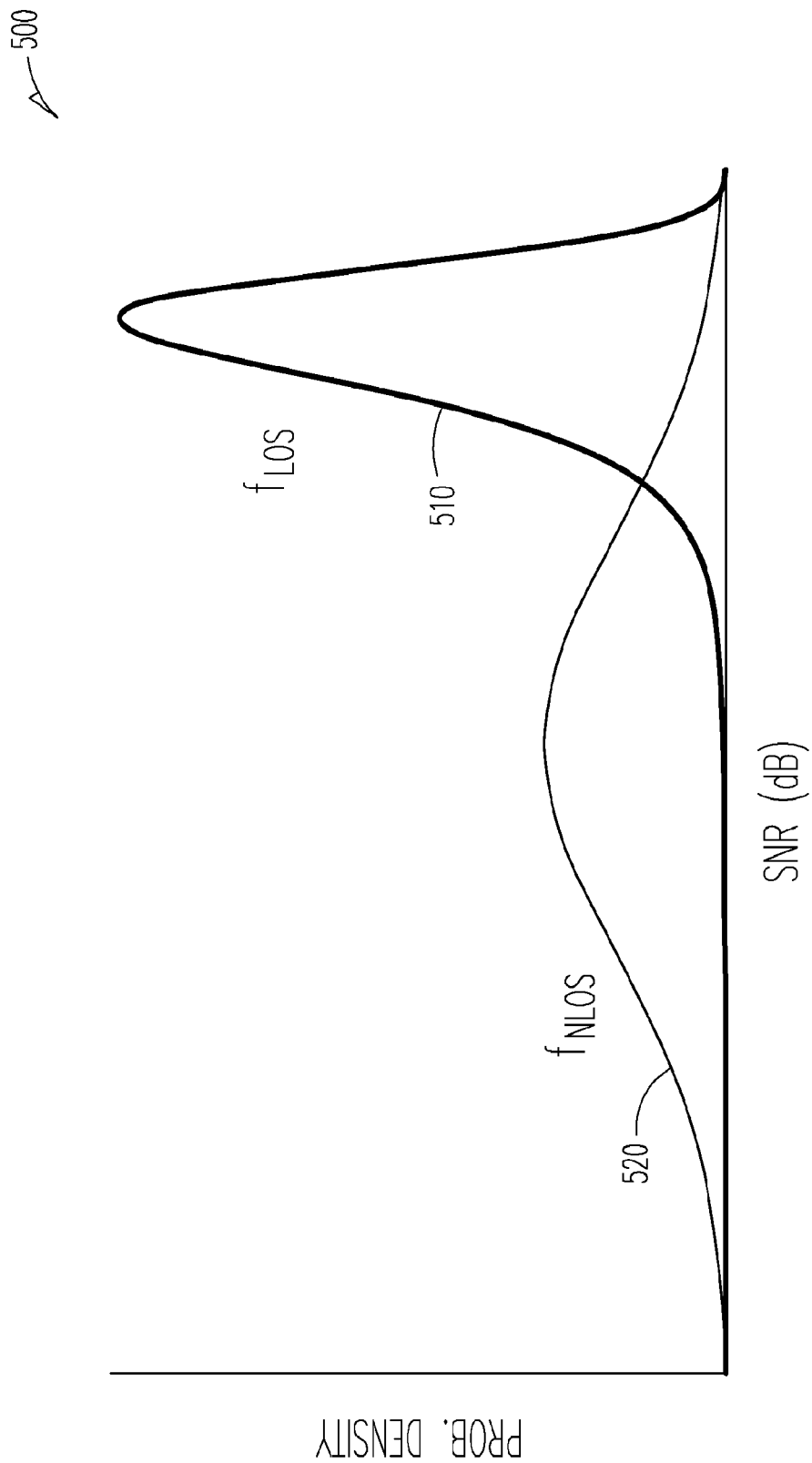
FIG. 5 is a plot of probability density as a function of satellite power distributions, according to an example embodiment.

FIG. 5 is a plot of probability density as a function of satellite power distributions 500, according to an embodiment. As depicted in FIG. 5, the received power of an LOS satellite may be modeled using a Rician fading distribution 510. This Rician fading distribution 510 models the LOS satellite power as a superposition of a dominant LOS component and a circular Gaussian component. Similarly, the received power of an NLOS satellite may be modeled using a Log-Normal fading distribution 520. This Log-Normal fading distribution 520 models the NLOS satellite power as predominantly characterized by variations due to random, multiplicative shadow fading. After a change of variables to define the Rice density on the decibel scale, the following probability density function (pdf) is obtained:

$$f_{LOS}(z_{t,n} \mid d) = \frac{\ln 10}{20} \frac{10^{z_{t,n}/10}}{s^2} \exp\left(-\frac{10^{z_{t,n}/10} + v^2}{2s^2}\right) I_0\left(\frac{10^{z_{t,n}/20} v}{s^2}\right)$$

where $$v^2 = \frac{K}{1+K}\hat{\Omega}_{t,n}, s^2 = \frac{\hat{\Omega}_{t,n}}{2(1+K)}, I_0(\cdot)$$

is the 0th order modified Bessel function of the first kind, and $\Omega_{t,n}$ and K are the total estimated channel power and the Rician "K factor" (ratio of LOS to diffuse power), respectively. As for the NLOS hypothesis, in decibels the Log-Normal fading model for NLOS channels is described by a normal distribution:

$$f_{NLOS}(z_{t,n} \mid d) = \frac{1}{\sqrt{2\pi\sigma^2}} \exp\left(-\frac{(z_{t,n} - \mu_{t,n})^2}{2\sigma^2}\right)$$

where $\mu_{t,n}$ is the mean fading value and $\sigma$ is the standard deviation.

While the system and method described herein characterizes LOS satellite power using a Rician fading distribution 510 and characterizes NLOS satellite power using a Log-Normal fading distribution 520, other distributions may be applied, and various distributions may be applied in combination. For example, satellite elevation may be used to augment the distribution. In particular, lower elevation satellites are more likely to be blocked or subject to multipath errors, and their distribution may be updated to include a wider distribution or longer distribution tails. In an example, the satellite elevation may be used to predict an expected overhead satellite constellation, and a lack of receipt of expected satellite measurements may be used to identify NLOS rays. Satellite elevations may be calculated based on ephemerides, where the ephemerides may be available via a network from JPL or another source.

Figure 6:
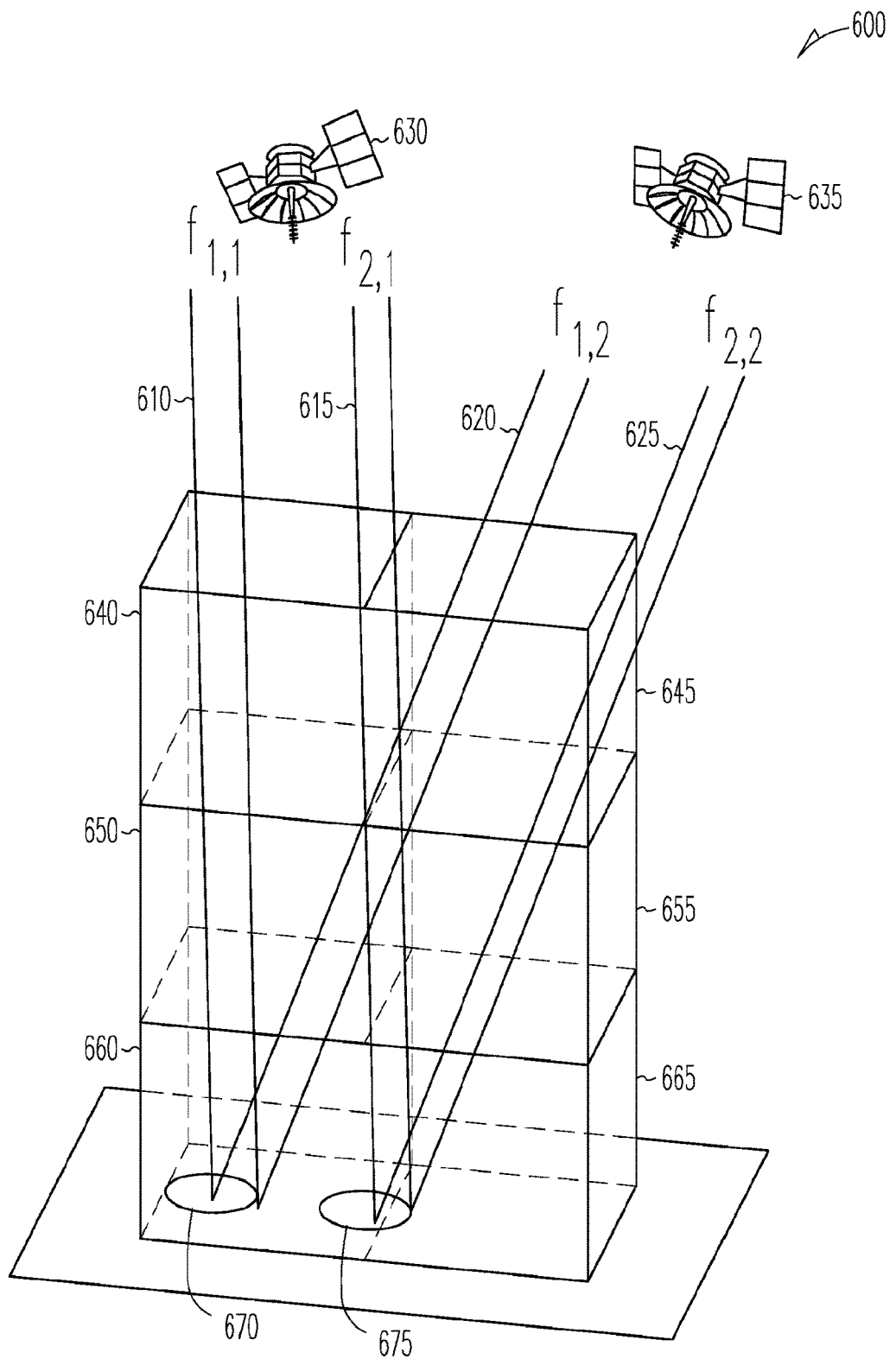
FIG. 6 shows an example simplified mapping cubic lattice, according to an example embodiment.

FIG. 6 shows an example simplified mapping cubic lattice 600, according to an embodiment. This cubic lattice construction is motivated at least in part by the spatial correlation of real-world map. FIG. 6 depicts four satellite rays 610, 615, 620, and 625. Rays 610, 615, 620, and 625 trace a path from two satellites 630 and 635 through one or more of six lattice cubes 640, 645, 650, 655, 660, and 665. Lattice cubes 640, 645, 650, and 660 may represent open space, and lattice cubes 655 and 665 may represent occupied space. In this example, satellite 630 may be overhead, and both LOS rays 610 and 615 may trace from satellite 630 through open lattice cubes 640, 650, and 660. Satellite 635 may not be overhead, and LOS ray 620 may trace from satellite 635 through open lattice cubes 645, 640, 650, and 660. In contrast to LOS rays 610, 615, and 620 tracing through open lattice cubes, NLOS ray 625 may trace from satellite 635 through open lattice cube 645, though occupied lattice cubes 650 and 660, and then through open lattice cube 660.

As suggested by FIG. 6, an SNR reading may be associated with the LOS channel distribution if all cells intersected by its associated ray are empty, otherwise it may be associated with the NLOS channel distribution. Assuming conditional independence of the measurements and ignoring localization errors in $x_t$, the posterior distribution of the map cells given the SNR-measurements and geo-location data is, by applying Bayes Theorem, $$p(m \mid x, z) = \frac{p(m)p(z \mid m, x)}{p(z)} \propto p(m) \prod_{t,n} p(z_{t,n} \mid x_t, m) \quad (1)$$

where p(m) is the prior probability distribution of the map, i.e., contains a-priori information on the map occupancy.

Generally, the SNR measurement model for a given GNSS signal may depend on a multitude of phenomena, including, but not limited to: radio frequency (RF) propagation effects (multipath, diffraction); environmental parameters (building penetration, building material, weather); and receiver characteristics (antenna patterns, RF/baseband filtering). While effective parametric statistical models exist for the narrowband Land to Mobile Satellite (LMS) channels of interest, to avoid over-modeling and greatly simplify the BP-based inference step, the forward measurement model may be defined as follows. Conditioned on the map m and positions $x_t$, each SNR measurement $z_{t,n}$ may be modeled as an independent random variable defined by one of two probability density functions:

$$P(z_{t,n} \mid x_t, m) = \begin{cases} f_{LOS}(z_{t,n}), & m_i = 0 \,\forall\, i \in \mathcal{M}(t,n) \\ f_{NLOS}(z_{t,n}), & \text{otherwise} \end{cases} \quad (2)$$

where M(t,n) denotes the indices of the cells intersected by the ray starting at receiver position $x_t$, in the direction of satellite n at time $_t$. As suggested above, (2) shows that SNR reading comes from the LOS channel distribution if all cells intersected by its associated ray are empty; otherwise, it comes from the NLOS channel distribution.

Figure 7:
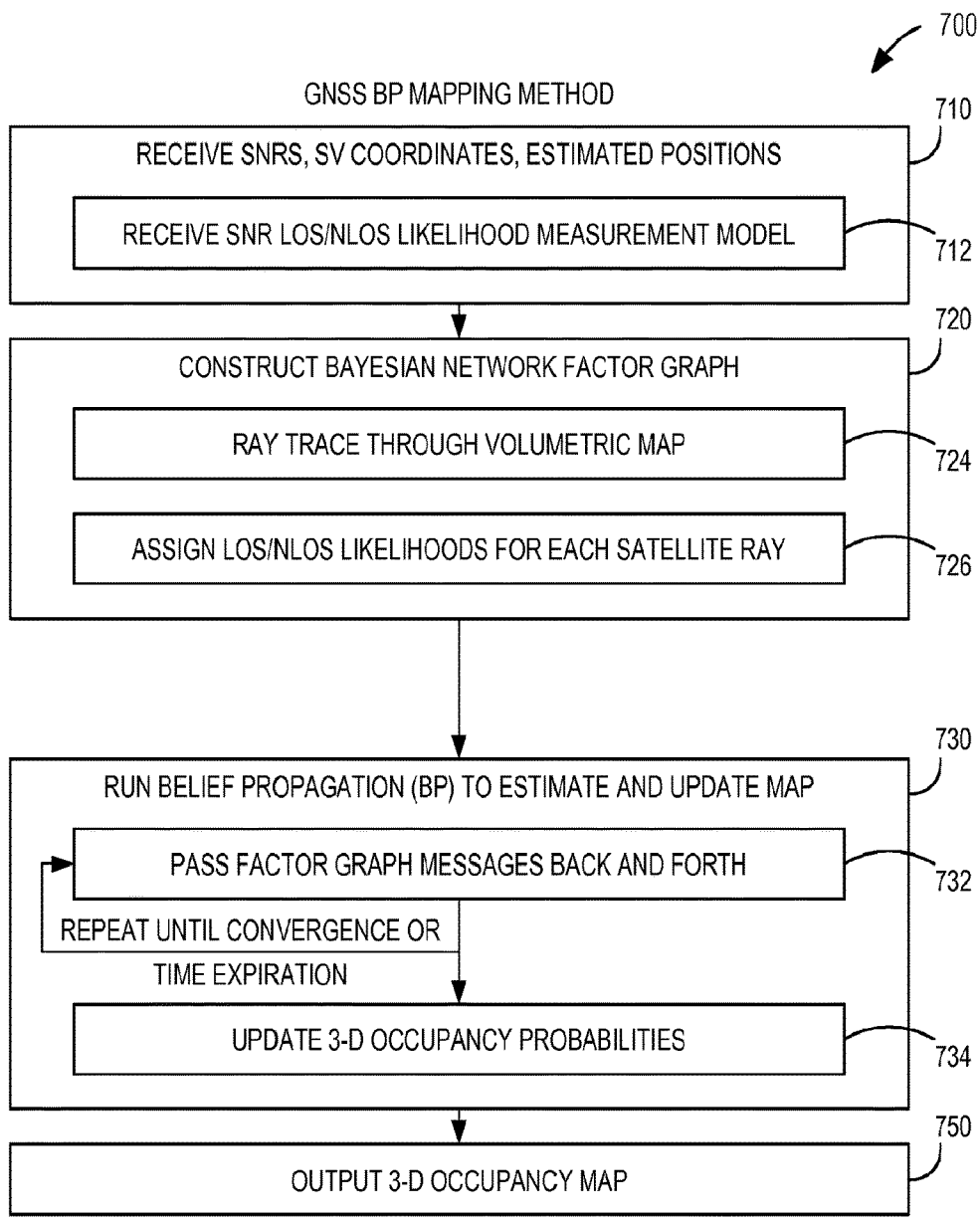
FIG. 7 is a block diagram of a GNSS BP mapping method, according to an example embodiment.

FIG. 7 is a block diagram of a GNSS BP mapping method 700, according to an embodiment. In one embodiment, method 700 may assume a motion model. Method 700 may include receiving 710 input GNSS data. Input GNSS data may include receiving multiple predicted satellite coordinates, receiving multiple measured signal-to-noise ratio (SNR) values, or receiving multiple estimated receiver locations. Input GNSS data may also include multiple prior map occupancy probabilities or multiple GNSS receiver uncertainty values. Receiving 710 input GNSS data may also include receiving 712 an SNR measurement model. The SNR measurement model may describe an expected relationship between multiple SNR measurements and multiple LOS/NLOS likelihoods.

Method 700 may include constructing 720 a Bayesian network factor graph, the Bayesian network factor graph including multiple factor graph nodes. Constructing 720 the Bayesian network factor graph may include sampling 722 multiple particles for multiple GNSS receiver positions. Constructing 720 the Bayesian network factor graph may include ray-tracing 724 multiple rays through multiple voxels within a volumetric map. Each of the rays may represent a GNSS satellite ray from a GNSS receiver position to each of multiple GNSS satellites. Constructing 720 the Bayesian network factor graph may also include storing multiple occupancy probabilities associated with each of the voxels within the volumetric map, each of the occupancy probabilities indicating a likelihood that each of the voxels is occupied by an obstruction. Constructing 720 the Bayesian network factor graph may also include assigning (e.g., associating) 726 a line-of-sight/non-line-of-sight (LOS/NLOS) probability with each of the rays.

Method 700 may include running 730 belief propagation to determine mapping estimates for multiple 3-D locations within a 3-D occupancy map. Running 730 belief propagation may include passing 732 messages between Bayesian network factor graph nodes. The Bayesian network factor graph nodes may include multiple map state variable nodes and multiple SNR likelihood factor nodes, and running 730 belief propagation may include passing 732 messages between the map state variable nodes and the SNR likelihood factor nodes. Passing 732 messages may be conducted according to a message passing schedule, where the schedule may be synchronous or asynchronous. Running 730 belief propagation may include holding position estimates constant. Running 730 belief propagation may be repeated until convergence on an output within a selected threshold, or may continue for a selected determining duration. The convergence of LBP may be declared when the mean of all variables' belief residuals falls below a predefined threshold Rth. To limit oscillations and help ensure that LBP converges, we may apply message damping with damping factor $\rho \in [0;1)$. The belief residuals of $m_i$ may be defined via the $L_1$ norm:

$$R_i \triangleq \sum_{m_i=0}^{1} |b_i(m_i) - b_i'(m_i)|, \quad R_t \triangleq \sum_{k=1}^{K} |b_t(x_t^k) - b_t'(x_t^k)|$$

where $b_i'$ are the beliefs from the previous iteration. While the belief residuals are defined here via the $L_1$ norm, other belief residuals may be used. Upon converging, or after one or more iterations without converging, running 730 belief propagation may update 734 3-D occupancy probabilities.

Method 700 may include applying 740 Bayesian shadow matching to determine a sequence of improved position estimates. Applying 740 Bayesian shadow matching may include applying 742 a particle filter while holding position estimates constant. Method 700 may include outputting 750 a navigation output. The navigation output may include a 3-D occupancy map including the 3-D occupancy probabilities.

Figure 8:
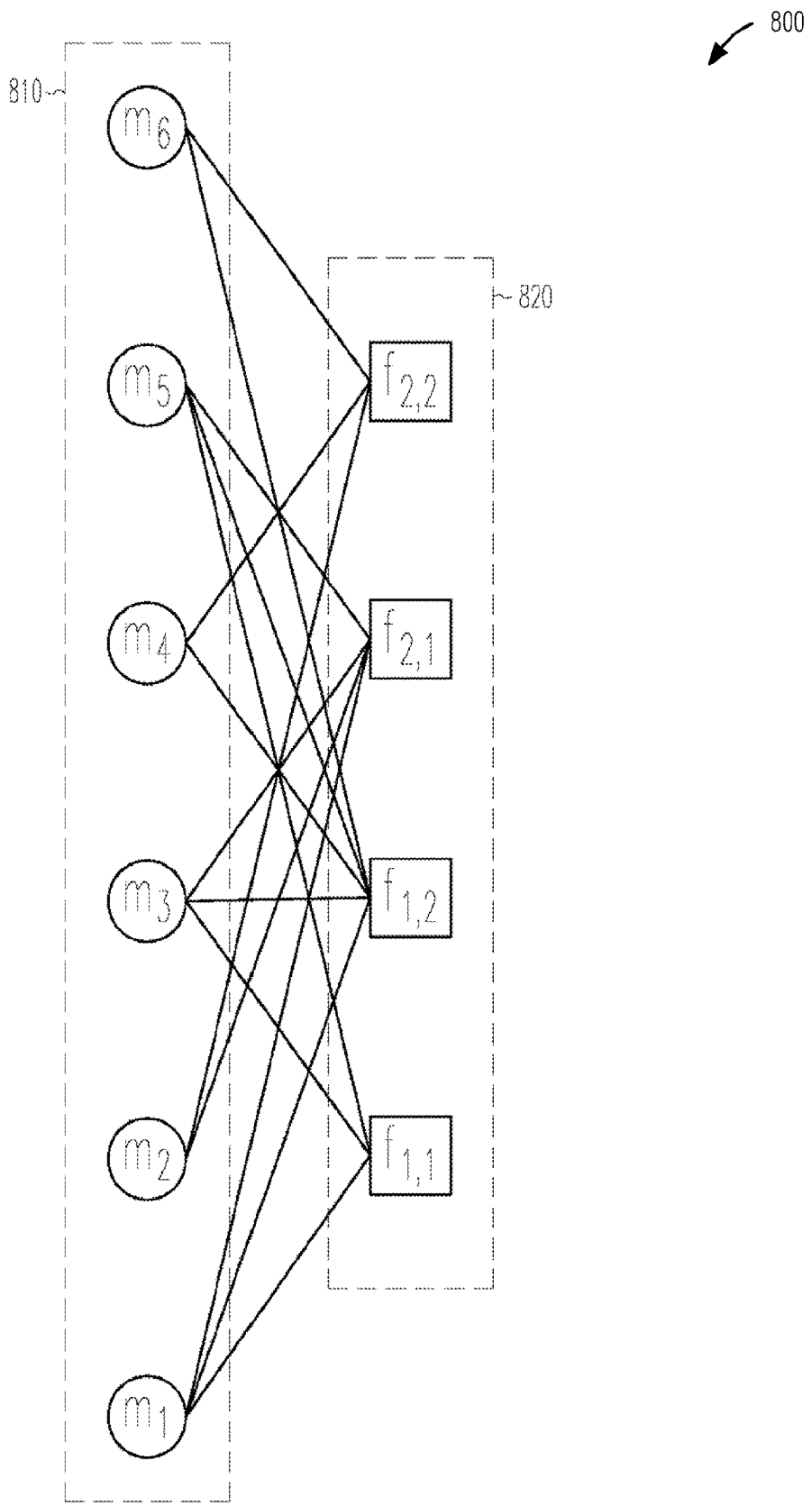
FIG. 8 shows a map posterior distribution factor graph, according to an example embodiment.

FIG. 8 shows a map posterior distribution factor graph 800, according to an embodiment. Factor graph 800 depicts the relationship between the LOS/NLOS channel model, the map prior distribution, and the map posterior distribution. Factor graph 800 is a bipartite graph with "map cell" variable nodes $m_i$ 820 and "SNR measurement" factor nodes 830, denoted $f_{t,n}$ corresponding to $p(z_{t,n}|x_t,m)$.

As illustrated in FIG. 8, the factor graph representing the map posterior contains complex interdependencies between the map cells, neighboring cells, and SNR measurements. An example technique used for efficient inference on such "loopy" factor graphs is the Loopy Belief Propagation (LBP) (e.g., Sum Product). LBP is iterative message passing algorithm that yields estimates of the marginal distributions of the variables after convergence, where convergence may be assumed but is not guaranteed. The present 3-D mapping system and method uses LBP, resulting in an output of the approximate occupancy probabilities for each grid cell, $p(m_i=1|z)$.

Figure 9:
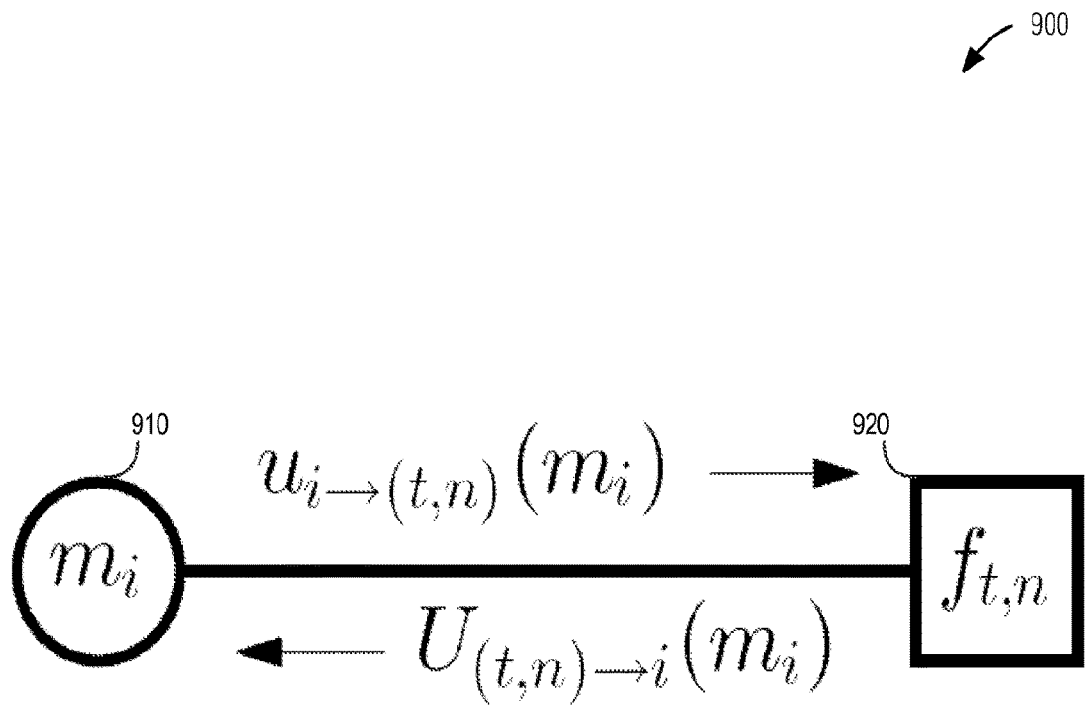
FIG. 9 show synchronous BP messages passing, according to an example embodiment.

FIG. 9 show synchronous BP messages passing 800, according to an embodiment. FIG. 9 shows one iteration of synchronous message passing with two classes of messages in a sub-graph containing the two types of vertices. One iteration of BP involves the sequential transmission of all variable-to-factor and factor-to-variable messages. Synchronous message passing (MP) may be used to simplify complexity, and the MP iterations may be initialized with uniform variable-to-factor messages equal to [0.5, 0.5].

Because the factor graph cell variables are binary valued, messages can be viewed as two-dimensional vectors. This allows decomposition of the factor graph shown in FIG. 8 into the two-dimensional vectors shown in FIG. 9. In particular, FIG. 9 shows the two-dimensional vector representing sending all messages from variables 910 to factors 930. The message from cell variable $m_i$ may be defined relative to its adjacent measurement factor $f_{t,n}$, which may be computed as follows:

$$u_{i \to (t,n)}(m_i) = \frac{\psi_i(m_i)}{C_u} \prod_{(\tau,\eta) \in \mathcal{F}(i) \setminus (t,n)} U_{(\tau,\eta) \to i}(m_i), \quad (3)$$

where F(i) indexes the adjacent factors, $\psi_i(m_i)$ is the cell prior, and $C_u$ is a constant ensuring $u_{i \to (t,n)}(0) + u_{i \to (t,n)}(1) = 1$. In the other direction, employing the standard Sum-Product formula yields $$U_{(t,n)\to i}(m_i) = \sum_{\sim(m_i)} p(z_{t,n} \mid m_i x_t) \prod_{j \in \mathcal{M}(t,n)\setminus i} u_{j\to(t,n)}(m_j) \quad (4)$$

where $\Sigma \sim \{m_i\}$ is the marginalization sum over mi, i.e., a sum over $2^{|M(t,n)|-1}$ terms where $|M(t,n)|$ in the number of cells observed by the SNR measurement. Because in our application measurement rays typically intersect tens to hundreds of map cells, evaluating (4) directly is unfeasible. However, upon substitution of (2), we obtain the simple formula:

$$U_{(t,n)\to i}(m_i) = \begin{cases} \alpha_{t,n,i} \cdot f_{LOS}(z_{t,n}) + \\ (1-\alpha_{t,n,i}) \cdot f_{NLOS}(z_{t,n}) & m_i = 0 \\ f_{NLOS}(z_{t,n}), & m_i = 1 \end{cases} \quad (5)$$

where $$\alpha_{t,n,i} = \prod_{j \in \mathcal{M}(t,n)\setminus i} u_{j\to(t,n)}(0). \quad (6)$$

Thus, due to the LOS/NLOS measurement model, computing (4). While computation of (4) generally includes an exponential complexity in the variable clique sizes, $|M(t,n)|$, this method reduces the computation to linear complexity. After convergence of the messages, the marginal posterior of each cell is approximated by the product of its incoming messages:

$$p(m_i \mid x, z) \approx \frac{\psi_i(m_i)}{C_m} \prod_{(t,n) \in \mathcal{S}(i)} U_{(t,n)\to i}(m_i) \quad (7)$$

where $C_m$ is a normalizing constant.

As suggested above, the systems and methods described herein advantageously reduce the computational complexity of generating a 3-D map. A substantial portion of the computational complexity of such a mapping method is contained in the iterations of the BP messages passing 800.

Figure 10:
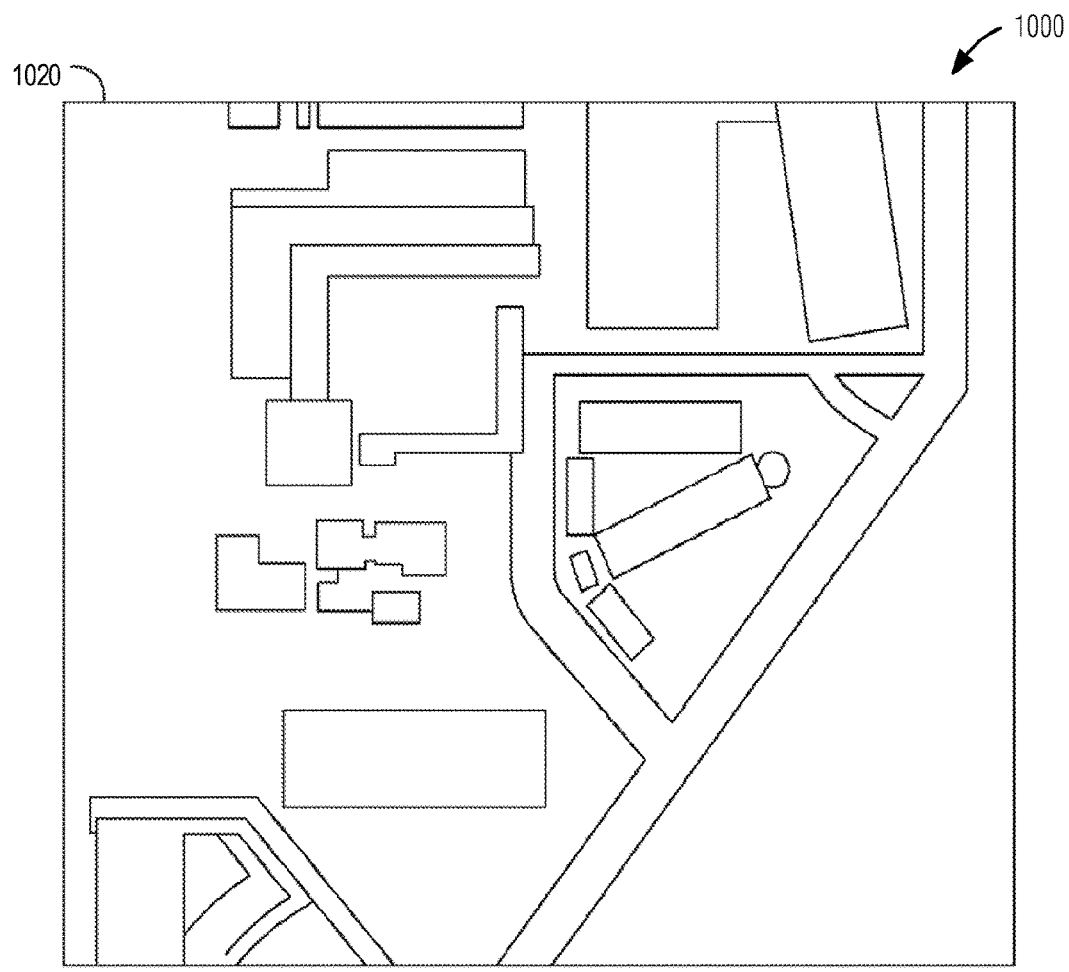
FIG. 10 shows an example aerial view of a building, according to an example embodiment.

FIG. 10 shows an example aerial view 1020 of a building, according to an example embodiment. This building is located at an eastern corner of the campus of the University of California, Santa Barbara (UCSB). Aerial view 1020 is compared to mapping results in FIGS. 12 and 18.

Figure 11:
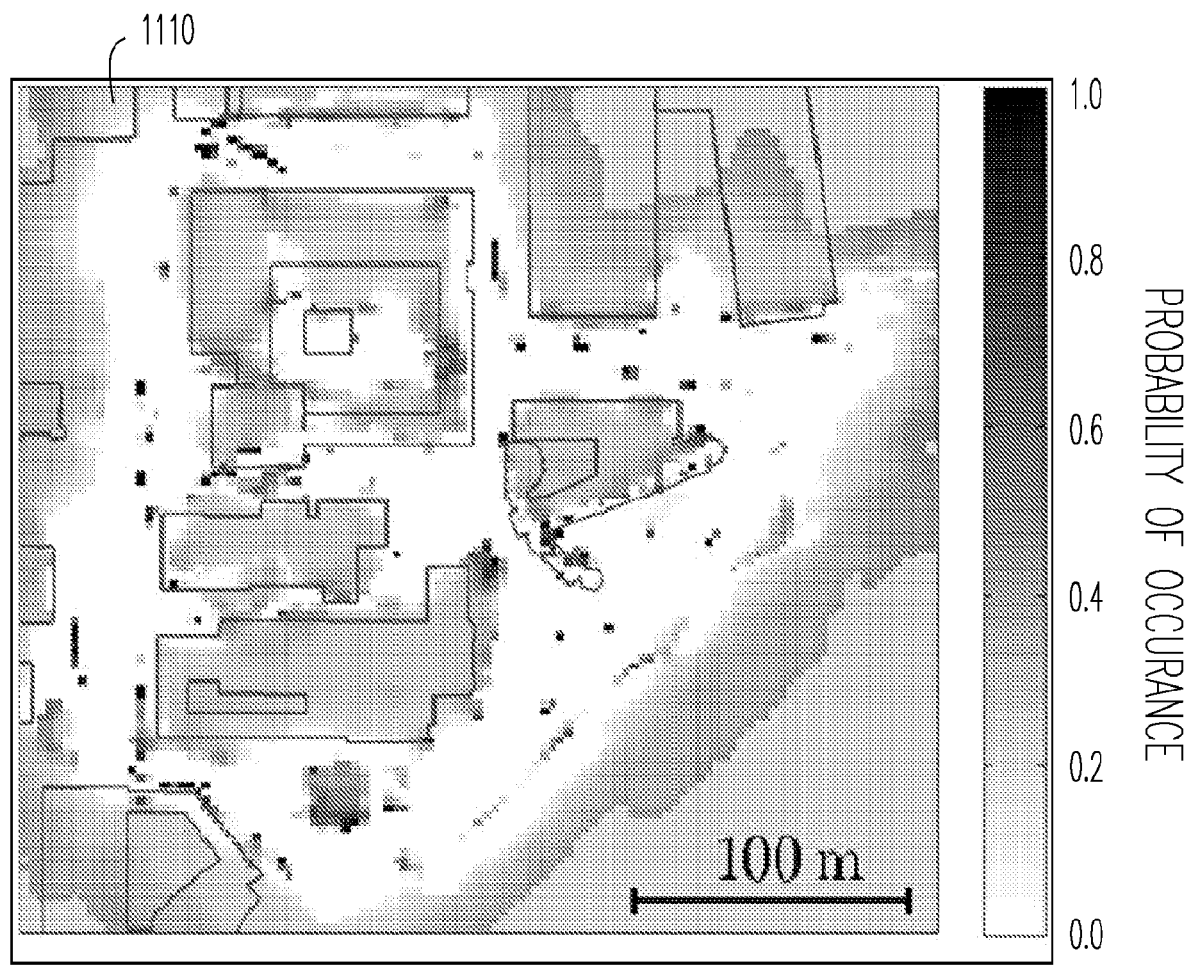
FIG. 11 shows an example mapping result, according to an example embodiment.

FIG. 11 shows an example mapping results 1100, according to an embodiment. Mapping result comparison 1100 includes an estimated horizontal layer 1110, and includes an aerial view 1120 of the same area. Example mapping result comparison 1100 was generated using GPS measurement data taken outdoors from the eastern corner of the campus of the University of California, Santa Barbara (UCSB). The GPS device used was a Samsung Galaxy Tablet 2.0 running on the Android operating system. The aggregate dataset included nine smaller datasets taken over several days, each containing approximately fifteen minutes of continuous measurement data arriving at 1 Hz. Reported satellite SNR readings ranged in the interval 6-48 dB/Hz, and during each smaller dataset an average of eighteen distinct satellites were in view. While a single pedestrian equipped with GNSS device played the role of the mapping agent in the experiment, the same mapping and parameter selection may apply if up to several robotic agents were to map a similar region across several distinct satellite constellations. Altogether, the nine datasets used in this example comprised of $1.23 \times 10^5$ individual SNR measurement rays and $1.93 \times 10^5$ individual grid cells. Due to the processing efficiencies realized in this method, these example datasets could be processed (including ray tracing, indexing the factor graph, and BP) in 320 seconds using MATLAB on a 64 bit PC with 4 GB of memory and an Intel Core i7-3517U processor clocked at 2.40 GHz.

Estimated horizontal layer 1110 corresponds to occupied space 3-6 meters above ground. As shown in the estimated horizontal layer 1110, white and black areas correspond respectively to areas with estimated occupancy probabilities close to zero and one. Similarly, shades of grey correspond to estimated occupancy probabilities between zero and one. The estimated horizontal layer 1110 also shows building contours obtained from OpenStreetMap. Though the probabilities indicated in the estimated horizontal layer 1110 do not map precisely to building contours, approximate building locations and several large trees can be clearly identified.

As suggested by mapping result comparison 1100, open areas may be easier to map than occupied ones. This may be a result of using passive, non-range sensing. In particular, while every cell intersected by a LOS signal ray is considered empty, a NLOS signal only informs that one or more occupied cell(s) occluded the ray. Hence, if a NLOS ray spans many occupied cells, then each cell will have a tendency to misattribute the blockage to nearby occupied cells. This misattribution can be seen in message and belief equations (9)-(11). If many other intersected cells $m_j$, $j \neq i$ have estimated occupancy beliefs around 0.5 (or higher), then $\alpha_{t,n,i}$ will be very small and the factor-to-variable message $U(t,n) \to i(m_i)$ will be proportional to the uninformative value [1,1] If $m_i$ receives many such uninformative messages, then its occupancy probability will be estimated at 0.5 as well. Thus, large buildings can be expected to result in "gray zones" corresponding to occupancy probabilities around 0.5, while empty space is more easily identified with high certainty.

The generation of mapping result comparison 1100 included selection of several parameters. A grid size (cell diameter) of d=3 m was selected, the map height was set to H=27 m, and a minimum satellite elevation of $\varphi_{min}=5°$ was chosen. For the BP-based inference step, synchronous message passing was employed and 25 iterations were deemed to suffice.

For satellites visible at the GPS receiver, the received power under the LOS hypothesis was modeled using a Rician distribution, given by (3). The estimated total channel power $\Omega_{t,n}$ was computed as the maximum of all linear SNR readings $10^{z_{t,v}/10}$ belonging to the same dataset $\eta_t$ and from the same satellite with identifier $\kappa_{t,n}$. For simplicity, the Rician K factor was set constant to K=2, indicating moderate fading conditions. For the Log-Normal SNR distribution (4) assumed under NLOS channel conditions, we set $\mu_{t,n} = 10_{log\ 10}\Omega_{t,n}-18$ and $\sigma=10$. That is, the expected signal degradation for a NLOS satellite link was set to 18 dB less than the estimated total power of the "reference" LOS link, and the standard deviation was set to 10 dB, reflecting a large variability in shadowing conditions. Note that, although in reality lower elevation LMS channels are characterized by wider power fluctuations, the widths of both LOS/NLOS distributions were kept constant across satellite elevations. When visibility to a particular satellite was temporarily lost in the middle of an observation window (presumably most often caused by total occlusion), values of fLOS(zt,n)=0.1, fNLOS(zt,n)=0.9 were assigned.

Figure 12:
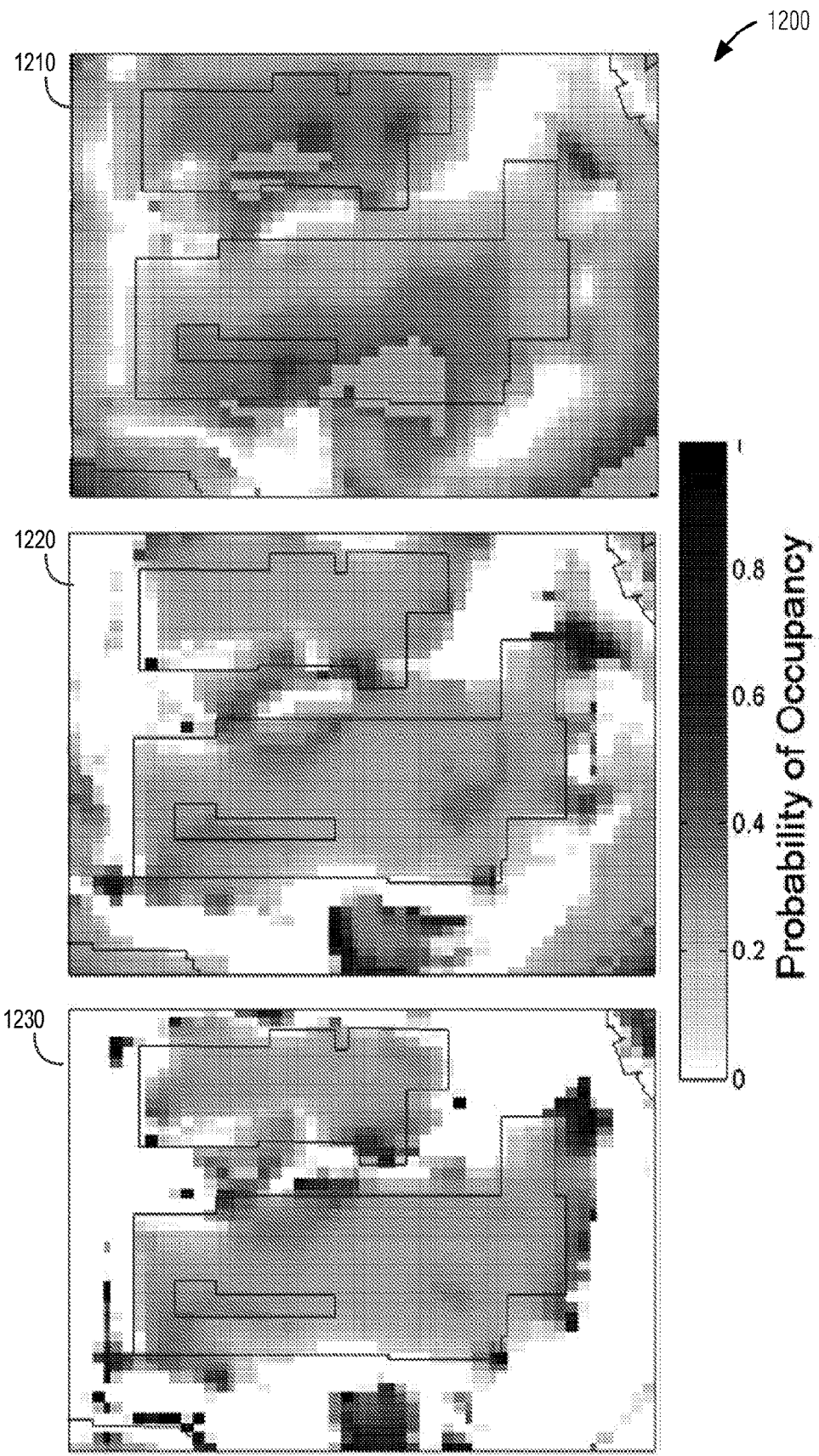
FIG. 12 shows measurement data increase comparison, according to an example embodiment.

FIG. 12 shows measurement data increase comparison 1200, according to an embodiment. The measurement data increase comparison 1200 includes three horizontal slices 3-6 m above ground level of generated maps as a function of number of datasets used, including a 1-dataset slice 1210, a 3-Dataset slice 1220, and a 9-dataset slice 1230. As with the estimated horizontal layer 1110, this measurement data increase comparison 1200 shows white and black areas corresponding respectively to areas with estimated occupancy probabilities close to zero and one, and shades of grey correspond to estimated occupancy probabilities between zero and one. As suggested by the measurement data increase comparison 1200, additional measurement data seem to improve the map quality over time, as expected.

Figure 13:
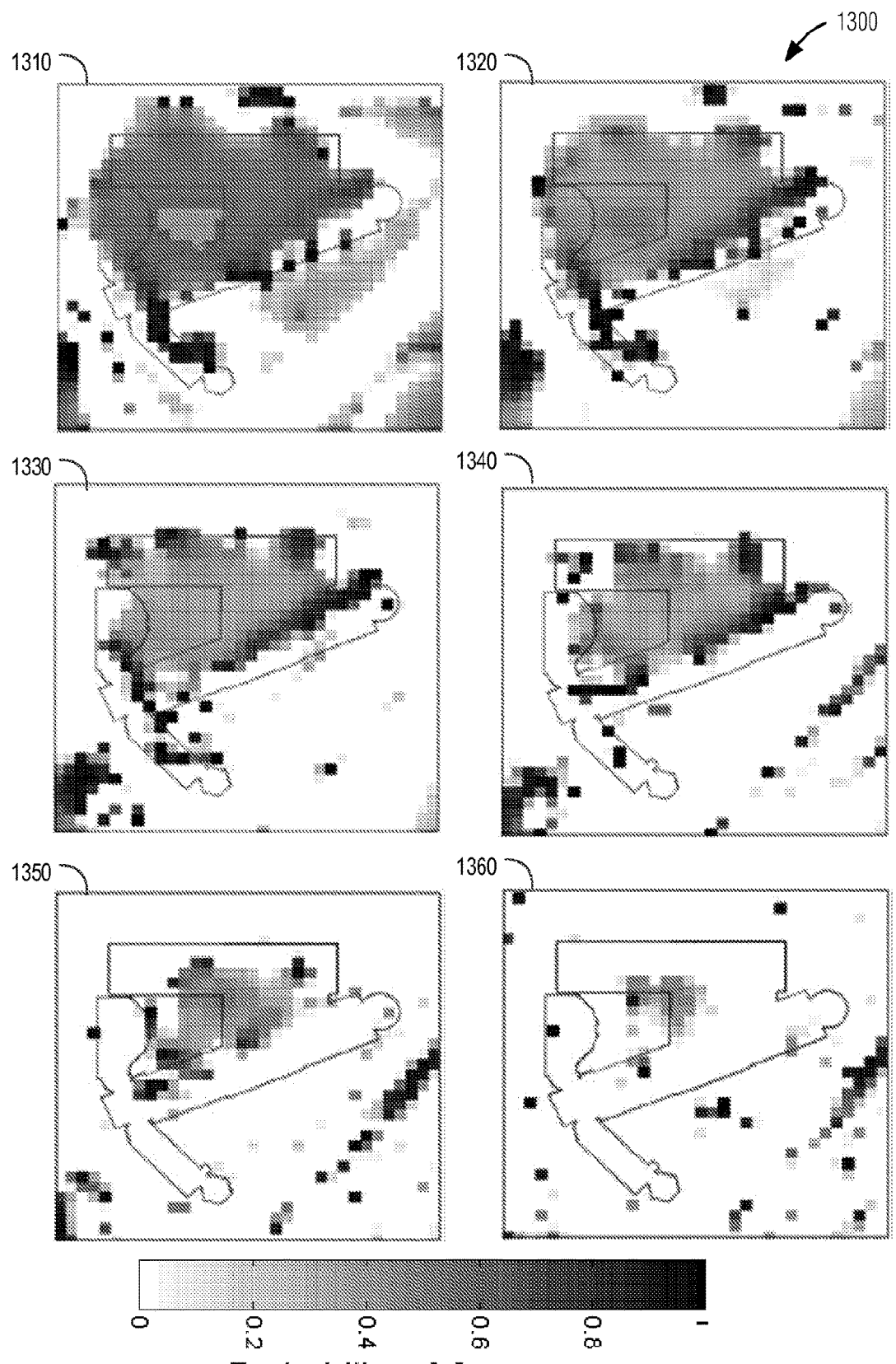
FIG. 13 shows a horizontal slice height comparison, according to an example embodiment.

FIG. 13 shows a horizontal slice height comparison 1300, according to an embodiment. This horizontal slice height comparison 1300 includes six horizontal layers of the 9-dataset map around one building. In particular, horizontal slice height comparison 1300 includes a 0-3 m slice 1310, a 3-6 m slice 1320, a 6-9 m slice 1330, a 9-12 m slice 1340, a 12-15 m slice 1350, and a 15-18 m slice 1360. In this example, the building is approximately ten meters in height, however the 12-15 m slice 1350 and 15-18 m slice 1360 show some nonzero probability of occupancy. This is caused, at least in part, by the use of ground-level GNSS measurements were used, which reduced the probability that LOS satellite signals intersected the middle part of the building roof. Even considering the NLOS artifacts shown above ten meters, horizontal slice height comparison 1300 suggests that the building is no taller than 18 m, and is likely shorter than 12-15 m.

Figure 14:
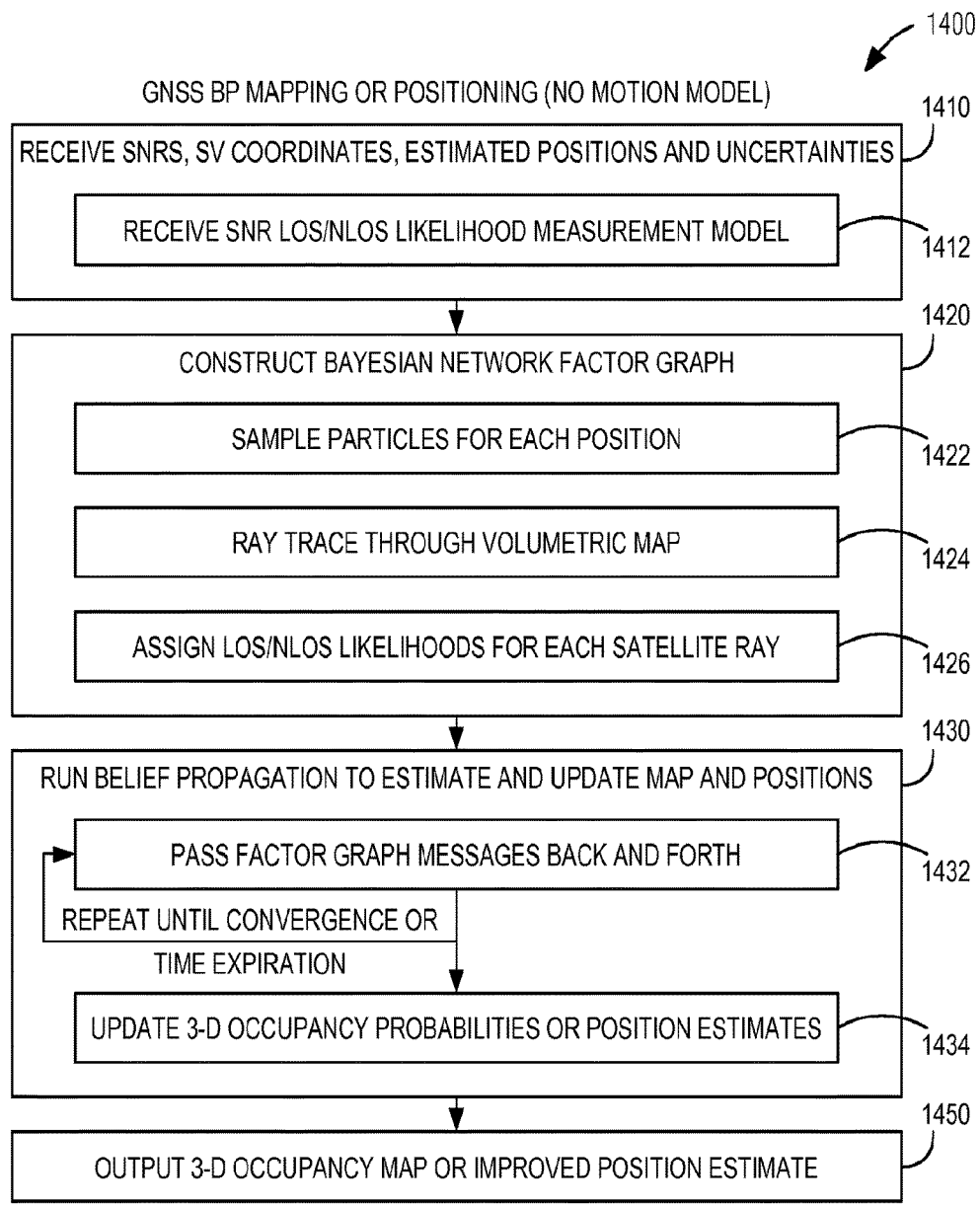
FIG. 14 is a block diagram of a GNSS BP mapping or positioning method, according to an example embodiment.

FIG. 14 is a block diagram of a GNSS BP mapping or positioning method 1400, according to an embodiment. In one embodiment, method 1400 may assume a motion model. Method 1400 may include receiving 1410 input GNSS data. Input GNSS data may include receiving multiple predicted satellite coordinates, receiving multiple measured signal-to-noise ratio (SNR) values, or receiving multiple estimated receiver locations. Input GNSS data may also include multiple prior map occupancy probabilities or multiple uncertainty values. Receiving 1410 input GNSS data may also include receiving 1412 an SNR measurement model. The SNR measurement model may describe an expected relationship between multiple SNR measurements and multiple LOS/NLOS likelihoods.

Method 1400 may include constructing 1420 a Bayesian network factor graph, the Bayesian network factor graph including multiple factor graph nodes. Constructing 1420 the Bayesian network factor graph may include sampling 1422 multiple particles for multiple GNSS receiver positions. Constructing 1420 the Bayesian network factor graph may include ray-tracing 1424 multiple rays through multiple voxels within a volumetric map. Each of the rays may represent a GNSS satellite ray from a GNSS receiver position to each of multiple GNSS satellites. Constructing 1420 the Bayesian network factor graph may also include storing multiple occupancy probabilities associated with each of the voxels within the volumetric map, each of the occupancy probabilities indicating a likelihood that each of the voxels is occupied by an obstruction. Constructing 1420 the Bayesian network factor graph may also include assigning (e.g., associating) 1426 a line-of-sight/non-line-of-sight (LOS/NLOS) probability with each of the rays.

Method 1400 may include running 1430 belief propagation to determine mapping estimates for multiple 3-D locations within a 3-D occupancy map. Running 1430 belief propagation may include passing 1432 messages between Bayesian network factor graph nodes. The Bayesian network factor graph nodes may include multiple map state variable nodes and multiple SNR likelihood factor nodes, and running 1430 belief propagation may include passing 1432 messages between the map state variable nodes and the SNR likelihood factor nodes. The Bayesian network factor graph nodes may include multiple position variable nodes, and running 1430 belief propagation may include passing 1432 messages between the position variable nodes and the SNR likelihood factor nodes. Passing 1432 messages may be conducted according to a message passing schedule, where the schedule may be synchronous or asynchronous. Running 1430 belief propagation may include holding position estimates constant. Running 1430 belief propagation may be repeated until convergence on an output within a selected threshold, or may continue for a selected determining duration. The convergence of LBP may be declared when the mean of all variables' belief residuals falls below a predefined threshold Rth. To limit oscillations and help ensure that LBP converges, we may apply message damping with damping factor ρ∈[0;1). The belief residuals of $m_i$ and $x_t$ may be defined via the $L_1$ norm:

$$R_i \triangleq \sum_{m_i=0}^{1} |b_i(m_i) - b_i'(m_i)|, \; R_t \triangleq \sum_{k=1}^{K} |b_t(x_t^k) - b_t'(x_t^k)|$$

where $b_i', b_t'$ are the beliefs from the previous iteration. While the belief residuals are defined here via the $L_1$ norm, other belief residuals may be used. Upon converging, or after one or more iterations before converging, running 1430 belief propagation may update 1434 3-D occupancy probabilities.

Method 1400 may include outputting 1450 a navigation output. The navigation output may include a 3-D occupancy map including the 3-D occupancy probabilities, or may include multiple improved position estimates, where the improved position estimates may or may not be in a sequence.

Figure 15:
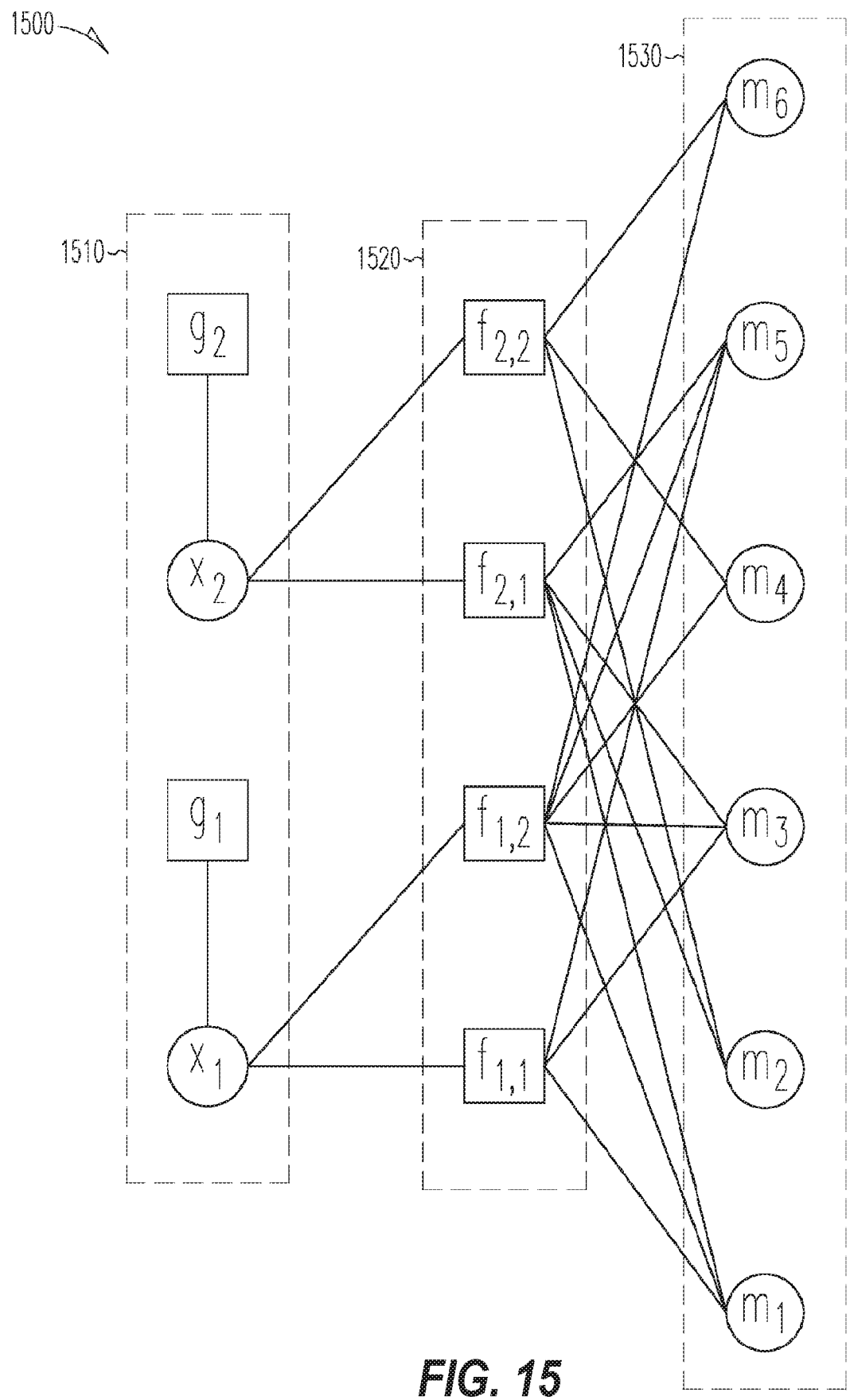
FIG. 15 shows a simultaneous localization and mapping (SLAM) factor graph, according to an example embodiment.

FIG. 15 shows a simultaneous localization and mapping (SLAM) factor graph 1500, according to an embodiment. The system and method of mapping a 3-D environment described above may be extended to provide enhanced localization in the form of position or motion estimates. Referring to FIG. 6, this simultaneous localization and mapping (SLAM) relies on ray tracing from sets of receiver locations (e.g., particles) $x_1$ 670 and $x_2$ 675 towards satellites 630 and 635. Probabilistic "beams" of rays, such as parallel rays 610 and 615 emanating from the same particle set $x_1$ 670 and $x_2$ 675 and heading to the same satellite 630, may be associated with a probability of being LOS or NLOS, depending on the measured satellite SNR value. These beams may be stitched together to form a soft probabilistic occupancy map using BP, which concurrently re-weights position particles and their departing rays, yielding revised location estimates.

SLAM factor graph 1500 is similar to map posterior distribution factor graph 800, however SLAM factor graph 1500 is extended to depict the relationship to the receiver locations (e.g., particles) $x_1$ 670 and $x_2$ 675. In particular, SLAM factor graph 1500 represents the map as a 3D grid of cells, $m=\{m_i\}^L$, with $m_i=\{0, 1\}$ denoting empty and occupied space, and approximates the continuous space of possible GNSS receiver positions $x=\{x_t\}_{t=1}$ using sets of particles so that $x_t=\{x^k\}^K$. The SLAM problem is then formulated as estimating the marginal distributions of each latent variable $m_i$ and $x_t$.

To arrive at these estimates information gathered and reported by GNSS receivers is used. The first type of information is the satellite SNR measurements, which are noisy and consist of T vector SNR readings, $z=\{z_t\}^T_{t=1}$, where $z_t=[z_{t,1}, \ldots, z_{t,N_t}]$, and $N_t$ is the number of satellites in view for the $t^{th}$ data sample. Together with individual SNR readings, the receivers also provide satellite identifiers and optionally satellite elevations and azimuths $[\theta_{t,n}, \varphi_{t,n}]$, which we consider noiseless. Under the assumption of a static world (when the map m does not change over time), the SNR measurements can be modeled as conditionally independent given the map and poses, yielding the following factorization:

$$p(z|m, x) = \prod_{t,n} p(x_{t,n} | m, x_t). \quad (8)$$

The SNR of a given GNSS signal also depends on many extraneous factors, such as environmental parameters, radio-wave propagation effects, and receiver characteristics. To that end, useful statistical models exist for the narrowband Land to Mobile Satellite (LMS) channels of interest. However, to simplify the computation of messages in our BP-based inference algorithm, we use the following sensor model $$p(z_{t,n} | m, x_t^k) = \begin{cases} f_{LOS}(z_{t,n}), & m_i = 0 \forall\, i \in \mathcal{M}(t, n, k) \\ f_{NLOS}(z_{t,n}), & \text{otherwise} \end{cases} \quad (9)$$

where M(t, n, k) contains the indices of the cells intersected by the ray starting at particle $x^k$, in the direction of satellite n at time t, i.e., its relative coordinates $[\theta_{t,n}, \varphi_{t,n}]$. In other words, an SNR reading is LOS-distributed if all cells intersected by the ray on which it is conditioned are empty; otherwise, it is NLOS-distributed. This is similar to the sensor model described above with respect to FIG. 6, and is intended to implement the same probability densities. As shown in FIG. 5, the SNR under LOS and NLOS hypotheses is modeled using Rician and Log-Normal distributions, though other distributions may be applied, and various distributions may be applied in combination. After a change of variables defining the Rice density on the decibel scale, the LOS density is defined as $$f_{LOS}(r_{dB}) = \frac{\ln 10}{20} 10^{r_{dB}/20} f_{Rice}(10^{r_{dB}/20}),$$

where $$f_{Rice}(r) = \frac{2(K_R+1)r}{\Omega} \exp\left(-K_R - \frac{(K_R+1)r^2}{\Omega}\right) \times I_0\left(2\sqrt{\frac{K_R(K_R+1)}{\Omega}}\, r\right),$$

$$r \geq 0$$

is the Rician fading density, $I_0(\cdot)$ is the 0th order modified Bessel function of the first kind, and $\Omega$ and $K_R$ are the total estimated channel power and the Rician "K factor" (ratio of LOS to diffuse power), respectively. As for the NLOS hypothesis, in decibels the Log-Normal fading model is simply described by a normal density with mean $\mu$ and variance $\sigma^2$.

The second type of information used are the receiver position estimates (GNSS fixes), denoted $y=\{y_t\}^T_{t=1}$, which are noisy and modeled as independent Gaussian random variables $$y_t = x_t + e_t, e_t \sim \mathcal{N}(0, C_t) \quad (10)$$

We estimate the error covariance using the coordinates and SNRs of the satellites used to compute the fix so that the position fixes do not depend directly on the state of map. Given the position uncertainties, the particles $\{x^k\}$ are then sampled according to $N(y_t, C_t)$ and assigned equal weights. In general, however, these particles can be sampled according to an importance distribution $q_t(\cdot)$ and assigned unequal weights proportionate to $N(x^k; y_t, C_t)/q_t(x^k)$. In some examples, it may be important that the input data is sparsely sampled in time. For example since (3) assumes the pose errors are unbiased and uncorrelated, consecutive GNSS fixes are known to be correlated and biased, so the use of input data that is sparsely sampled in time mitigates the effects of those correlations and biases. As an additional example, in the motion model framework below, the error correlations are mitigated due to enhanced tracking, which may allow the use of more finely sampled GNSS fixes (e.g., those not sparsely sampled in time).

Assuming no a-priori information on the map and poses (such as information on building locations or a motion model governing x), and making use of (1), (3), the posterior distribution of the latent variables given the measurements factorizes as follows:

$$p(m, x | y, z) \propto p(y, z | m, x) = p(z | m, x)p(y | m, x, z) \quad (11)$$

$$= \prod_{t,n} p(z_{t,n} | m, x_t) \cdot \prod_t p(y_t | z_t, x_t).$$

However, as described above, per-cell priors $\psi_i(m_i)$ may also be included in a manner similar to the mapping approach. For example, as explained above with respect to FIG. 4, map prior information may be used to initialize (e.g., seed or hot start) the map.

Figure 16A:
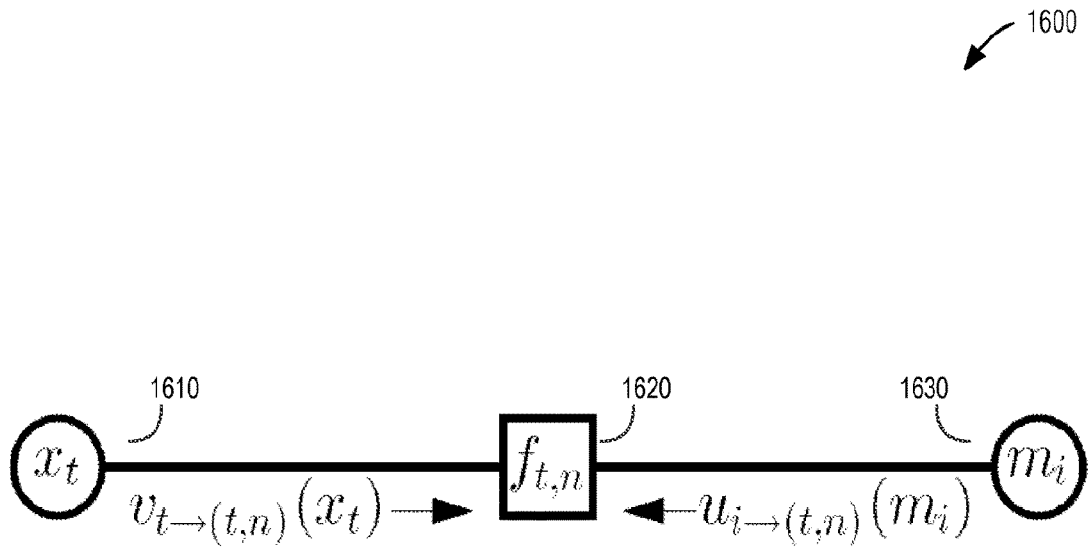
FIGS. 16A and 16B show synchronous SLAM BP messages passing, according to an example embodiment.
Figure 16B:
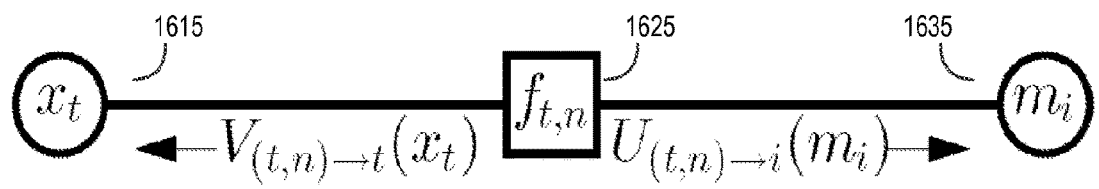

FIGS. 16A and 16B show synchronous SLAM BP messages passing 1600, according to an embodiment.[i] FIGS. 16A and 16B show one iteration of synchronous message passing in a sub-graph containing the three types of vertices. Because the factor graph cell variables are binary valued, messages can be viewed as two-dimensional vectors. This allows decomposition of the factor graph shown in FIG. 15 into the two-dimensional vectors shown in FIGS. 16A and 16B. In particular, FIG. 16A shows the two-dimensional vector representing the first step of sending all messages from variables 1620 to factors 1610 and 1630, and FIG. 16B shows the two-dimensional vector representing the second step of sending all messages from factors 1615 and 1635 to variables 1625. Note that the factor nodes $\{g_t\}$ play no role in message passing since they are singly connected and because all particles $\{x^k\}$ are assigned equal weights after sampling.

As discussed above, Loopy Belief Propagation is an efficient message passing algorithm used to perform approximate inference on the variables in such graphs, whereby messages are passed locally along edges graph until convergence (which is assumed but not guaranteed in loopy graphs). In the present implementation of BP, we use a synchronous message passing strategy which, in one iteration, involves the sequential transmission of messages from all variable nodes to factor nodes, and vice versa. In particular, each iteration of BP involves the sequential transmission of all variable-to-factor and factor-to-variable messages. Synchronous message passing (MP) may be used to simplify complexity, and the MP iterations may be initialized with uniform variable-to-factor messages equal to [0.5, 0.5].

At the variable nodes, computing the outgoing messages is quite simple. The first step in arriving at them is to compute the variables' beliefs, which are also used to determine convergence. For nodes $m_i$ and $x_t$, on their respective domains ($m_i \in \{0,1\}$ and $x_t \in \{x_t^1, \ldots, x_t^K\}$), the beliefs are given by $$b_i(m_i) \propto \prod_{(t,n) \in \mathcal{F}(i)} U_{(t,n) \to i}(m_i), \quad b_t(x_t) \propto \prod_{n=1}^{N_t} V_{(t,n) \to t}(x_t),$$

where $V_{(t,v) \to t}$ and $U_{(t,v) \to t}$ are incoming messages from $f_{t,v}$, $F(i) = \{(t,n): i \in M(t,n)\}$ indexes the $\{f_{t,n}\}$ neighboring and the beliefs are normalized to sum to one. These nodes' outgoing messages to factor node $f_{t,n}$ can then be written as follows:

$$u_{i \to (t,n)}(m_i) \propto \frac{b_i(m_i)}{U_{(t,n) \to i}(m_i)}, \quad v_{t \to (t,n)}(x_t) \propto \frac{b_t(x_t)}{V_{(t,n) \to t}(x_t)},$$

which are also normalized to sum to one after computation.

In the other direction, computing the factor-to-variable messages is more complicated. For example, calculation of the messages from $f_{t,n}$ to $x_t$, and evaluating at $x_t = x_t^k$, yields:

$$V_{(t,n) \to t}(x_t^k) = \sum_m p(z_{t,n} | m, x_t^k) \prod_{j \in \mathcal{M}(t,n)} u_{j \to (t,n)}(m_j),$$

which involves the summation of $2^{|M(t,n)|}$ terms. Since in our setup beams (t,n) typically intersect hundreds of cells, evaluating this directly is clearly unfeasible. However, upon substitution of the SNR model, and keeping in mind the unit-normalization of the messages $\{u_{i \to (t,n)}(m_i)\}$, the above expression simplifies as follows:

$$V_{(t,n) \to t}(x_t^k) = \gamma_{t,n}^k f_{LOS}(z_{t,n}) + (1 - \gamma_{t,n}^k) f_{NLOS}(z_{t,n}),$$

where:

$$\gamma_{t,n}^k = \prod_{i \in \mathcal{M}(t,n,k)} u_{i \to (t,n)}(0),$$

which is of linear complexity in $|M(t,n,k)|$. Likewise, for the message from SNR measurement $f_{t,n}$ to cell $m_i$ we initially have the (even more) complicated expression $$U_{(t,n) \to i}(m_i) = \sum_{m \backslash m_i} \sum_k p(z_{t,n} | m, x_t^k) \times v_{t \to (t,n)}(x_t^k) \prod_{j \in \mathcal{M}(t,n) \backslash i} u_{j \to (t,n)}(m_j)$$

However, again, by consequence of the binary sensor model, the above expression reduces to $$U_{(t,n) \to i}(m_i) = \alpha_{t,n,i} + \beta_{t,n,i}(m_i)$$

where $$\alpha_{t,n,i} = \sum_{k \notin \mathcal{K}(t,n,i)} v_{t \to (t,n)}(x_t^k) \times \{\gamma_{t,n}^k f_{LOS}(z_{t,n}) + (1 - \gamma_{t,n}^k) f_{NLOS}(z_{t,n})\},$$

$$\beta_{t,n,i}(0) = \sum_{k \in \mathcal{K}(t,n,i)} v_{t \to (t,n)}(x_t^k) \times \{\gamma_{t,n,i}^k f_{LOS}(z_{t,n}) + (1 - \gamma_{t,n,i}^k) f_{NLOS}(z_{t,n})\},$$

$$\beta_{t,n,i}(1) = f_{NLOS}(z_{t,n}) \sum_{k \in \mathcal{K}(t,n,i)} v_{t \to (t,n)}(x_t^k),$$

where $$\gamma_{t,n,i}^k = \gamma_{t,n}^k / u_{i \to (t,n)}(0),$$

and $K(t,n,i) = \{k . i \in M(t,n,k)\}$ maintains a list of which particles among $\{x_t^1, \ldots, x_t^K\}$ observe cell $m^i$ when looking at the nth satellite.

The convergence of LBP may be declared when the mean of all variables' belief residuals falls below a predefined threshold Rth. To limit oscillations and help ensure that LBP converges, we may apply message damping with damping factor $\rho \in [0;1)$. The belief residuals of $m_i$ and $x_t$ may be defined via the $L_1$ norm:

$$R_i \triangleq \sum_{m_i=0}^{1} |b_i(m_i) - b_i'(m_i)|, \quad R_t \triangleq \sum_{k=1}^{K} |b_t(x_t^k) - b_t'(x_t^k)|$$

where $b_i', b_t'$ are the beliefs from the previous iteration. While the belief residuals are defined here via the $L_1$ norm, other belief residuals may be used. Upon convergence, or after one or more iterations before convergence, the approximate SLAM solution is simply taken to be the beliefs of all the latent variables, i.e., the marginal posteriors of the map and poses are estimated as $p(m_i|y,z) \approx b_i(m_i)$ and $p(x_t|y,z) \approx b_t(x_t)$.

Figure 17:
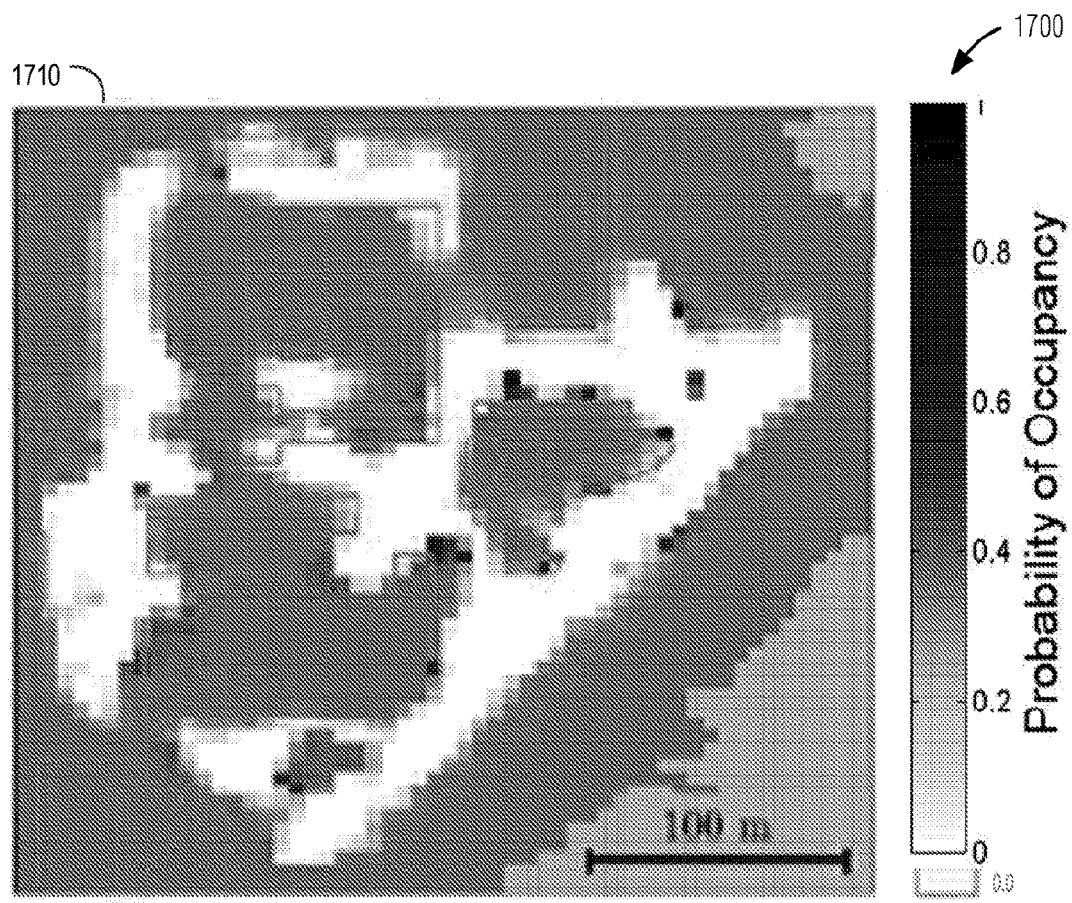
FIG. 17 shows an example mapping result comparison, according to an example embodiment.

FIG. 17 shows an example mapping result comparison 1700, according to an embodiment. Mapping result comparison 1700 includes an estimated horizontal layer 1710, and includes an aerial view 1720 of the same area. Example mapping result comparison 1700 was generated using GPS measurement data taken outdoors from the eastern corner of the campus of the University of California, Santa Barbara (UCSB).

A grid size of 6 m was selected, and the map height was set to 36 m. For the BP-based inference step, 30 iterations of message passing was used. For satellites visible at the GPS receiver, the received power under the LOS hypothesis was modeled using a Rician distribution. The estimated total channel power $\Omega$ for each SNR reading was to the maximum of all linear SNR readings 10 zt,n/10 from the same satellite during the same time window. For simplicity, the Rician K factor was set constant to KR=2, indicating moderate fading conditions. For the Log-Normal SNR distribution assumed under NLOS channel conditions we set μ (the expected signal power) to 18 dB below the reference power level $\Omega$, and the standard deviation was set to 10 dB, reflecting a large variability in shadowing conditions. When visibility to a particular satellite was temporarily lost in the middle of an observation window (presumably most often caused by total occlusion), the satellite coordinates were interpolated and likelihoods of $f_{LOS}(z_{t,n})$=0.1, $f_{NLOS}(z_{t,n})$=0.9 were assigned. A total of 33 data-sets comprised of $3.75 \times 10^4$ SNR measurements that interacted with $6.58 \times 10^3$ grid cells in the map were used. To mitigate the effects of spatial correlation of geo-location errors, the $3.75 \times 10^4$ measurements represent a factor of 10 downsampling of the original data-set. With 100 particles used to represent the possible geo-location of the receiver at each measurement, the map was generated in approximately 24 minutes on a 64 bit PC with 32 GB of memory and a 3.20 GHz Intel Core i7 processor running MATLAB R2013a.

Estimated horizontal layer 1710 corresponds to occupied space 0-6 meters above ground. As shown in the estimated horizontal layer 1710, white and black areas correspond respectively to areas with estimated occupancy probabilities close to zero and one. Similarly, shades of grey correspond to estimated occupancy probabilities between zero and one. The estimated horizontal layer 1710 also shows building contours obtained from OpenStreetMap. Though the probabilities indicated in the estimated horizontal layer 1710 do not map precisely to building contours, approximate building locations and several large trees can be clearly identified.

Figure 18:
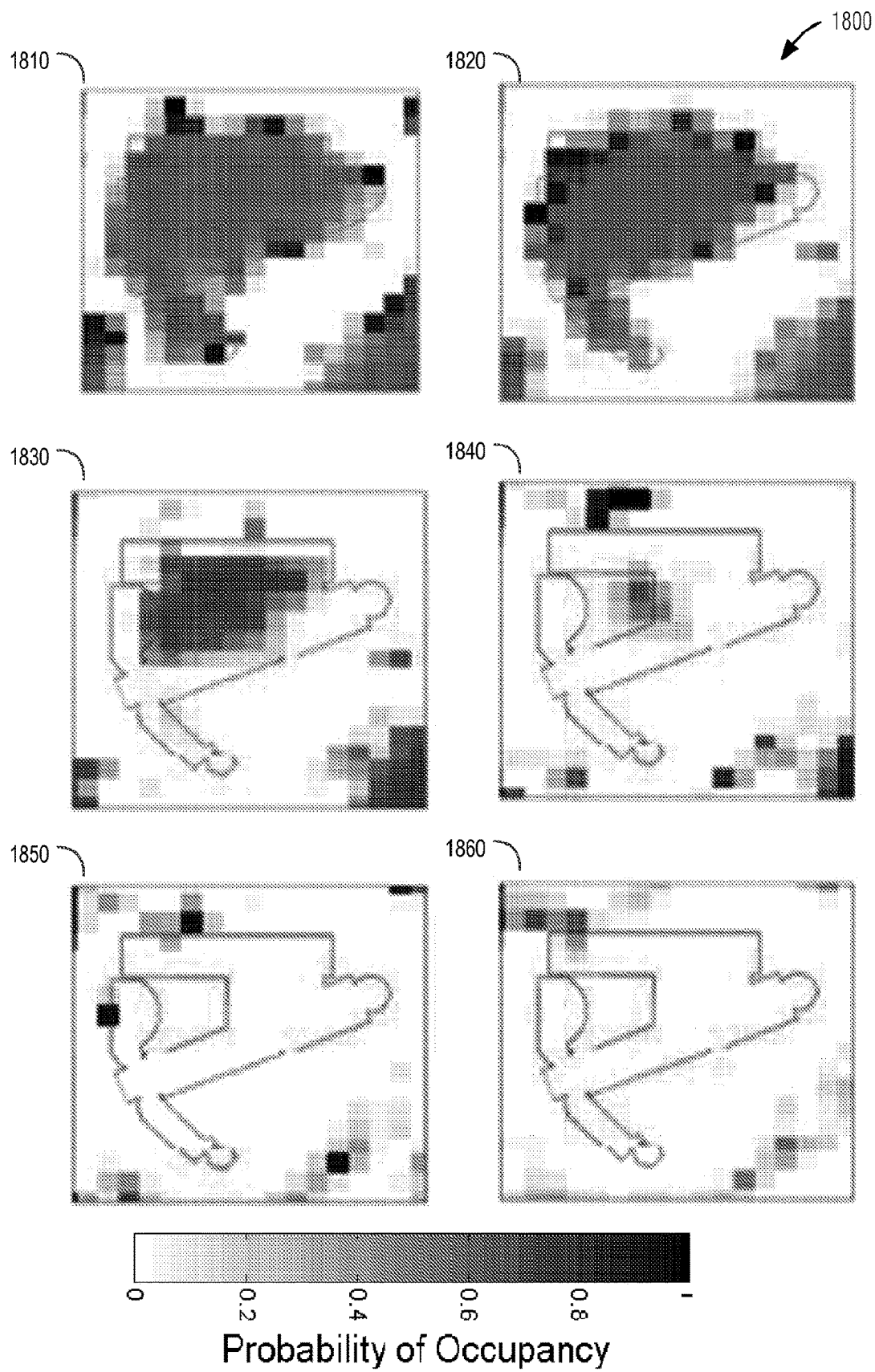
FIG. 18 shows a horizontal slice height, according to an example embodiment.

FIG. 18 shows a horizontal slice height 1800, according to an embodiment. This horizontal slice height comparison 1800 includes six horizontal layers of the 9-dataset map around the building shown in FIG. 10. In particular, horizontal slice height comparison 1800 includes a 0-3 m slice 1810, a 3-6 m slice 1820, a 6-9 m slice 1830, a 9-12 m slice 1840, a 12-15 m slice 1850, and a 15-18 m slice 1860. FIG. 18 shows several dark spots outside of buildings, such as the dark spot on the south side of the southernmost building. Such dark spots often correspond to trees, as can be seen from the aerial view in FIG. 17.

Figure 19:
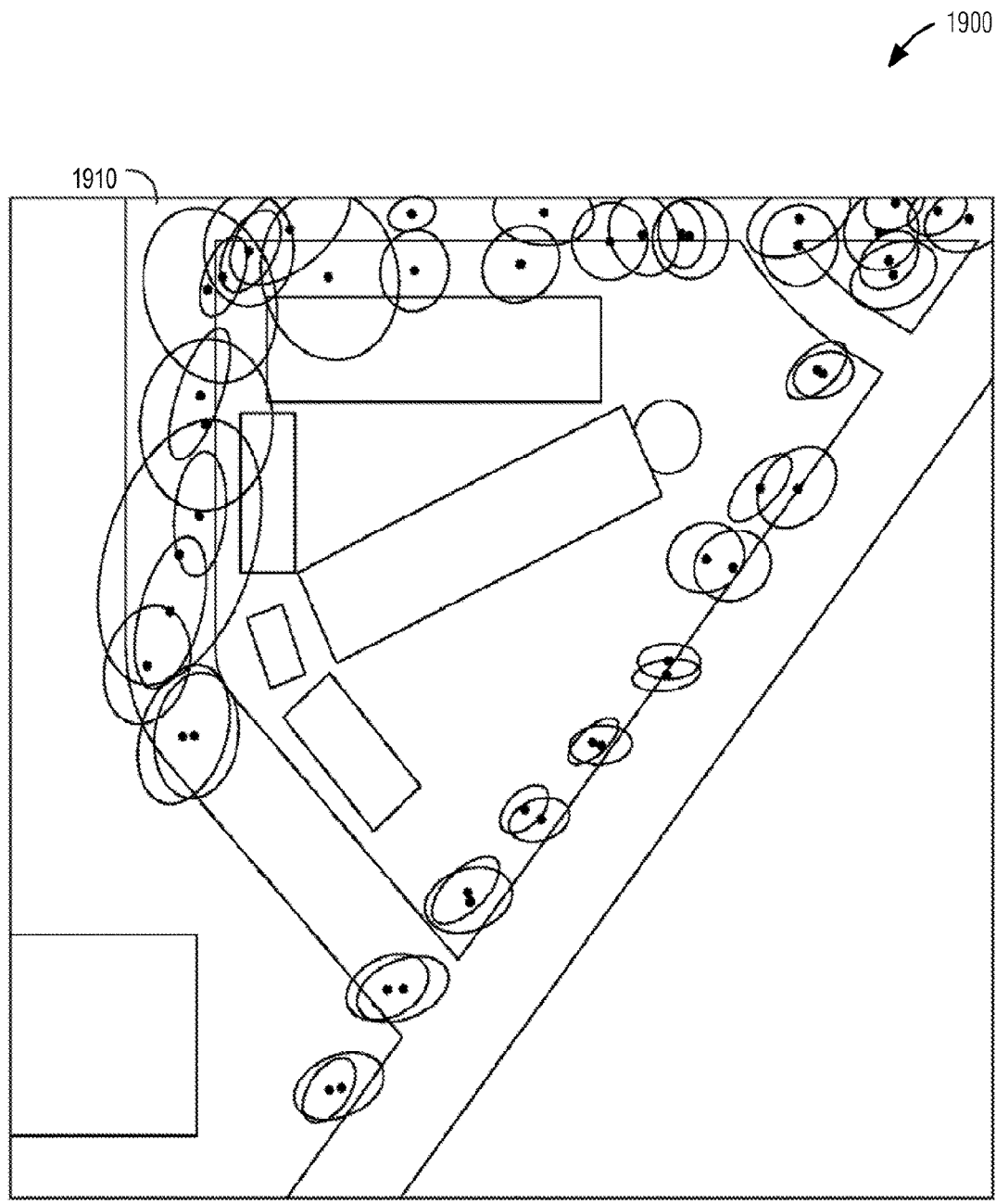
FIG. 19 shows GPS receiver position fixes and uncertainty ellipses, according to an example embodiment.

FIG. 19 shows GPS receiver position fixes and uncertainty ellipses 1900, according to an embodiment. In this example of the localization improvement, a portion of the dataset corresponding to a known path by the receiver was isolated for analysis. The receiver latitude/longitude fixes and corresponding larger uncertainty ellipses are shown, and the improved position estimate and an smaller ellipse corresponding to the sample covariance of the particles are shown. Of particular interest are the points in the north-west corner of the building 1910 where the original fix has errors of several meters in the direction of the building. The proposed algorithm pushes the particles associated with this position fix away from the building and back on the sidewalk near the true path. Without this position correction, the resulting map would have underestimated the occupancy of the cells on the northern wall of the building.

Figure 20:
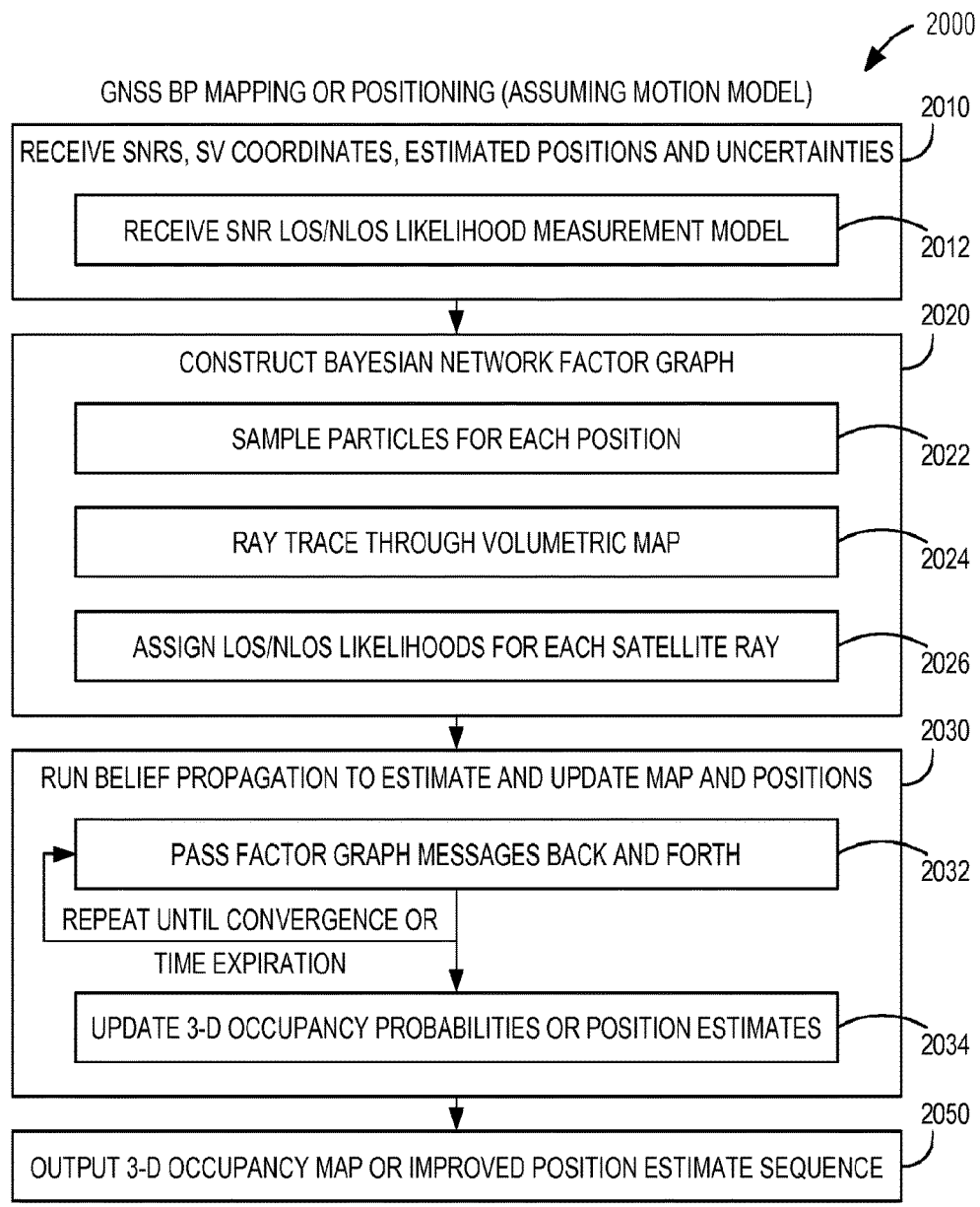
FIG. 20 is a block diagram of a GNSS BP mapping or positioning method, according to an example embodiment.

FIG. 20 is a block diagram of a GNSS BP mapping or positioning method 2000, according to an embodiment. In one embodiment, method 2000 may assume a motion model. Method 2000 may include receiving 2010 input GNSS data. Input GNSS data may include receiving multiple predicted satellite coordinates, receiving multiple measured signal-to-noise ratio (SNR) values, or receiving multiple estimated receiver locations. Input GNSS data may also include multiple prior map occupancy probabilities or multiple uncertainty values. Receiving 2010 input GNSS data may also include receiving 2012 an SNR measurement model. The SNR measurement model may describe an expected relationship between multiple SNR measurements and multiple LOS/NLOS likelihoods.

Method 2000 may include constructing 2020 a Bayesian network factor graph, the Bayesian network factor graph including multiple factor graph nodes. Constructing 2020 the Bayesian network factor graph may include sampling 2022 multiple particles for multiple GNSS receiver positions. Constructing 2020 the Bayesian network factor graph may include ray-tracing 2024 multiple rays through multiple voxels within a volumetric map. Each of the rays may represent a GNSS satellite ray from a GNSS receiver position to each of multiple GNSS satellites. Constructing 2020 the Bayesian network factor graph may also include storing multiple occupancy probabilities associated with each of the voxels within the volumetric map, each of the occupancy probabilities indicating a likelihood that each of the voxels is occupied by an obstruction. Constructing 2020 the Bayesian network factor graph may also include assigning (e.g., associating) 2026 a line-of-sight/non-line-of-sight (LOS/NLOS) probability with each of the rays.

Method 2000 may include running 2030 belief propagation to determine mapping estimates for multiple 3-D locations within a 3-D occupancy map. Running 2030 belief propagation may include passing 2032 messages between Bayesian network factor graph nodes. The Bayesian network factor graph nodes may include map state variable nodes, SNR likelihood factor nodes, position variable nodes, and motion variable nodes. Running 2030 belief propagation may include passing 2032 messages between each of these nodes. Passing 2032 messages may be conducted according to a message passing schedule, where the schedule may be synchronous or asynchronous. Running 2030 belief propagation may be repeated until convergence on an output within a selected threshold, or may continue for a selected determining duration. The convergence of LBP may be declared when the mean of all variables' belief residuals falls below a predefined threshold Rth. To limit oscillations and help ensure that LBP converges, we may apply message damping with damping factor $\rho \in [0;1)$. The belief residuals of $m_i$ and $x_t$ may be defined via the $L_1$ norm:

$$R_i \triangleq \sum_{m_i=0}^{1} |b_i(m_i) - b_i'(m_i)|, \quad R_t \triangleq \sum_{k=1}^{K} |b_t(x_t^k) - b_t'(x_t^k)|$$

where $b_i', b_t'$ are the beliefs from the previous iteration. While the belief residuals are defined here via the $L_1$ norm, other belief residuals may be used. Upon converging, or before converging after one or more iterations, running 2030 belief propagation may update 2034 3-D occupancy probabilities and receiver position estimates.

Method 2000 may include outputting 2050 a navigation output. The navigation output may include a 3-D occupancy map including the 3-D occupancy probabilities, or may include a sequence of improved position estimates.

Figure 21:
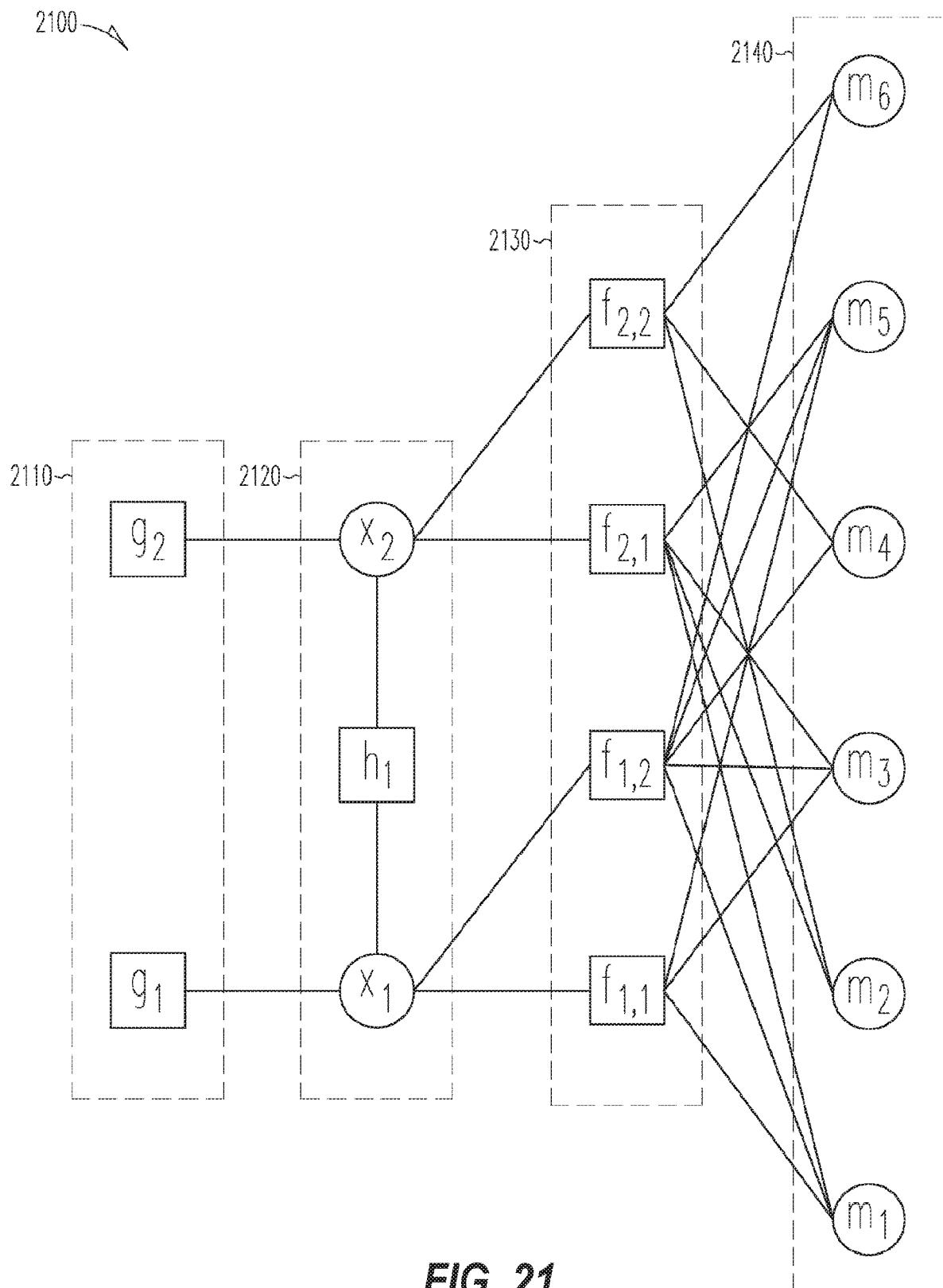
FIG. 21 shows a motion factor graph, according to an embodiment, according to an example embodiment.

FIG. 21 shows a motion factor graph 2100, according to an embodiment. As suggested above, the system and method of mapping a 3-D environment may be extended to provide enhanced localization in the form of estimates of position derivatives (e.g., position, velocity, acceleration). Referring to FIG. 6, this motion factor graph 2100 can be visualized as a motion from receiver location $x_1$ 670 to receiver location $x_2$ 675.

The motion model corresponding to the motion factor graph 2100 puts kinematic constraints on the trajectory a GNSS user can follow. In general, its use in SLAM leads to better position estimates and smoother estimated paths, and, in turn, more accurate estimates of the environment map. To include a motion factor graph 2100 in a BP framework, we augment the receiver state variables $\{x_t\}$ with position derivatives, such as velocity and acceleration. Because GPS devices can generally observe user velocity, the GPS fix factors $\{g_t\}$ may vary as a function of the velocity, however the SNR measurement factors do not and only directly depend on the position part of the state. We then introduce additional motion factors $\{h_t\}$ between successive pose variables in time. The factor functions $h_t(x_t, x_{t+1})$ generally vary across time step t, nominally depending on the sampling interval between successive position nodes or on additional motion type assumptions. For example, a linear Gaussian "constant velocity" model may be used.

The motion model corresponding to the motion factor graph 2100 may be incorporated into a positioning-only algorithm. If one is only interested in performing localization given the current estimate of the map, one may avoid using belief propagation altogether by freezing the map state. That is, by holding the messages from the map cells $\{m_i\}$ constant and not propagating messages back to the map cells, one may perform localization using standard Bayesian filtering techniques on the sequence of variable $\{x_t\}$. For example, if one is only interested in the most recent position estimate for a given device, one could apply standard sequential Markov Chain Monte Carlo algorithms, such as the particle filtering Markov Chain Monte Carlo algorithm. Instead, if one were interested obtaining more precise estimates of past path segments, one could perform standard particle smoothing algorithms.

Figure 22:
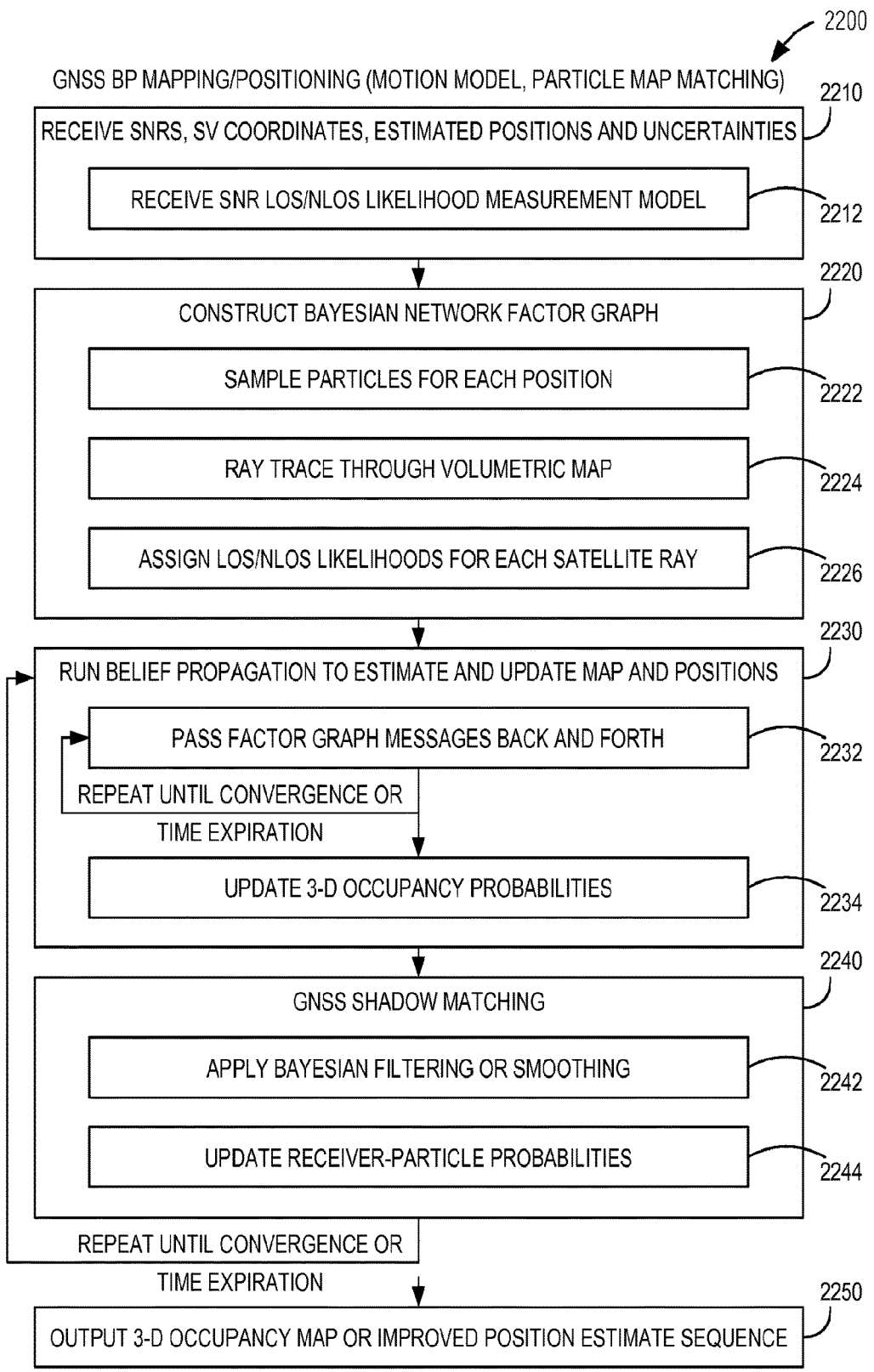
FIG. 22 is a block diagram of a GNSS BP mapping or positioning method, according to an example embodiment.

FIG. 22 is a block diagram of a GNSS BP mapping or positioning method 2200, according to an embodiment. In one embodiment, method 2200 may assume a motion model, and may include particle map matching. Method 2200 may include receiving 2210 input GNSS data. Input GNSS data may include receiving multiple predicted satellite coordinates, receiving multiple measured signal-to-noise ratio (SNR) values, or receiving multiple estimated receiver locations. Input GNSS data may also include multiple prior map occupancy probabilities or multiple uncertainty values. Receiving 2210 input GNSS data may also include receiving 2212 an SNR measurement model. The SNR measurement model may describe an expected relationship between multiple SNR measurements and multiple LOS/NLOS likelihoods.

Method 2200 may include constructing 2220 a Bayesian network factor graph, the Bayesian network factor graph including multiple factor graph nodes. Constructing 2220 the Bayesian network factor graph may include sampling 2222 multiple particles for multiple GNSS receiver positions. Constructing 2220 the Bayesian network factor graph may include ray-tracing 2224 multiple rays through multiple voxels within a volumetric map. Each of the rays may represent a GNSS satellite ray from a GNSS receiver position to each of multiple GNSS satellites. Constructing 2220 the Bayesian network factor graph may also include storing multiple occupancy probabilities associated with each of the voxels within the volumetric map, each of the occupancy probabilities indicating a likelihood that each of the voxels is occupied by an obstruction. Constructing 2220 the Bayesian network factor graph may also include assigning (e.g., associating) 2226 a line-of-sight/non-line-of-sight (LOS/NLOS) probability with each of the rays.

Method 2200 may include running 2230 belief propagation to determine mapping estimates for multiple 3-D locations within a 3-D occupancy map. Running 2230 belief propagation may include passing 2232 messages between Bayesian network factor graph nodes. The Bayesian network factor graph nodes may include multiple map state variable nodes and multiple SNR likelihood factor nodes, and running 2230 belief propagation may include passing 2232 messages between the map state variable nodes and the SNR likelihood factor nodes. Passing 2232 messages may be conducted according to a message passing schedule, where the schedule may be synchronous or asynchronous. Running 2230 belief propagation may include holding position estimates constant. Running 2230 belief propagation may be repeated until convergence on an output within a selected threshold, or may continue for a selected determining duration. The convergence of LBP may be declared when the mean of all variables' belief residuals falls below a predefined threshold Rth. To limit oscillations and help ensure that LBP converges, we may apply message damping with damping factor $\rho \in [0;1)$. The belief residuals of $m_i$ and $x_t$ may be defined via the $L_1$ norm:

$$R_i \triangleq \sum_{m_i=0}^{1} |b_i(m_i) - b_i'(m_i)|, R_t \triangleq \sum_{k=1}^{K} |b_t(x_t^k) - b_t'(x_t^k)|$$

where $b_i', b_t'$ are the beliefs from the previous iteration. While the belief residuals are defined here via the $L_1$ norm, other belief residuals may be used. Upon converging, or before converging but after one or more iterations, running 2230 belief propagation may update 2234 3-D occupancy probabilities and receiver position estimates.

Method 2200 may include applying 2240 Bayesian shadow matching to determine a sequence of improved position estimates. Applying 2240 Bayesian shadow matching may include applying 2242 a particle filter (or particle smoother) while holding map estimates constant. Applying 2240 Bayesian shadow matching may be repeated until convergence on an output within a selected threshold, or may continue for a selected determining duration. Upon converging, running 2030 belief propagation may update 2034 3-D occupancy probabilities. An embodiment of applying 2240 Bayesian shadow matching is shown and described further with respect to FIG. 25.

Method 2200 may include outputting 2250 a navigation output. The navigation output may include a 3-D occupancy map including the 3-D occupancy probabilities, or may include a sequence of improved position estimates.

Figure 23:
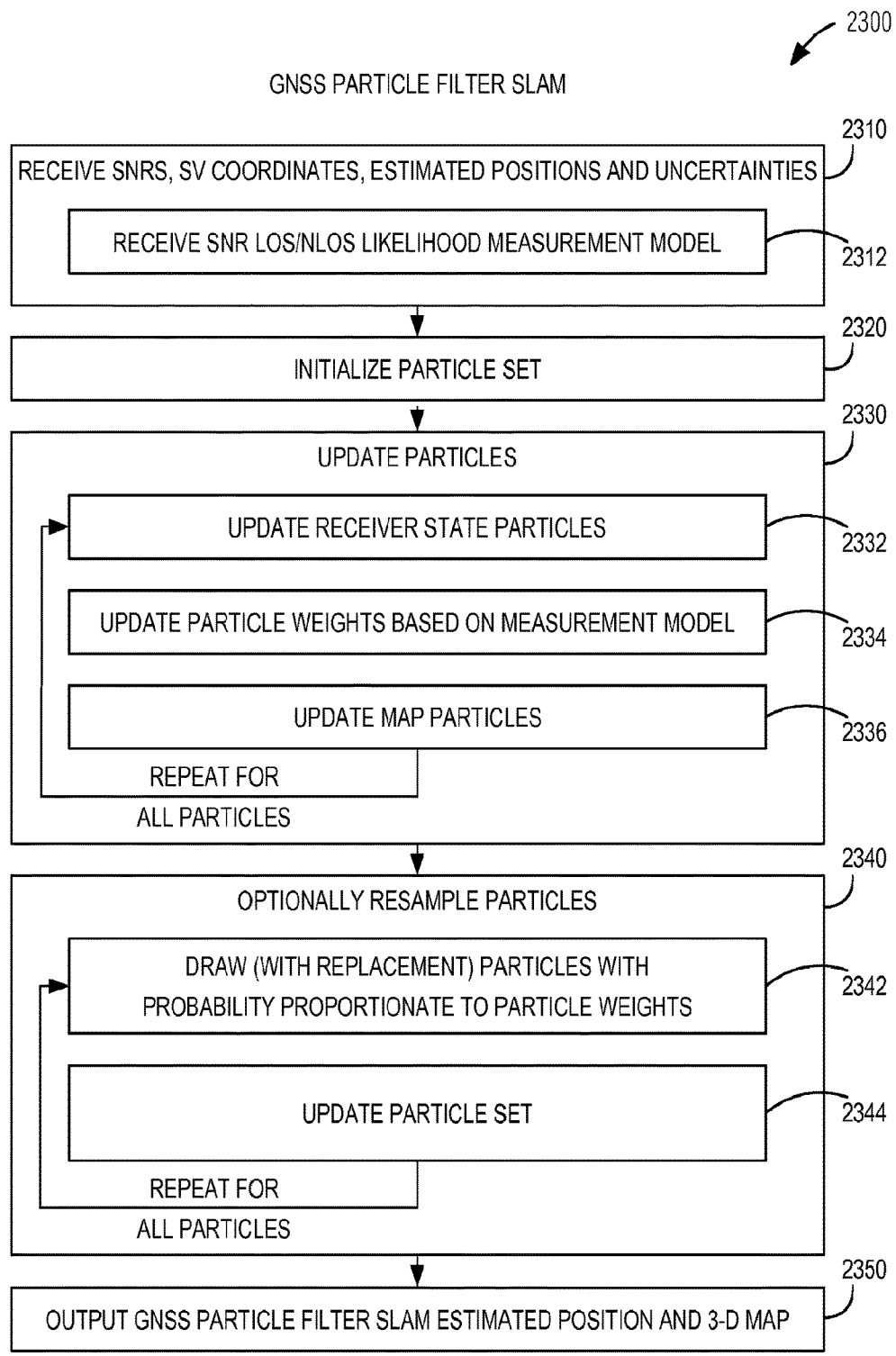
FIG. 23 is a block diagram of a GNSS particle filter SLAM method, according to an embodiment, according to an example embodiment.

FIG. 23 is a block diagram of a GNSS particle filter SLAM method 2300, according to an embodiment. In one embodiment, SLAM method 2320 may include receiving 2310 GNSS data. Input GNSS data may include receiving multiple predicted satellite coordinates, receiving multiple measured signal-to-noise ratio (SNR) values, or receiving multiple estimated receiver locations. Input GNSS data may also include multiple prior map occupancy probabilities or multiple uncertainty values. Receiving 2310 input GNSS data may also include receiving 2312 an SNR measurement model. The SNR measurement model may describe an expected relationship between multiple SNR measurements and multiple LOS/NLOS likelihoods.

SLAM method 2320 may include initialization 2320 of a particle set. SLAM method 2320 may include updating 2330 particles. Updating 2330 particles may include updating 2332 receiver state particles. Updating 2330 particles may also include updating 2334 particle weights based on a measurement model and updating 2336 map particles. Updating 2330 particles may be repeated for all particles. SLAM method 2320 may include resampling 2340 particles. Resampling 2340 particles may include drawing 2342 particles. Drawing 2342 particles may include drawing particles with probability proportionate to particle weights, and may include drawing with replacement. Resampling 2340 particles may include updating 2344 the particle set. Resampling 2340 particles may be repeated for all particles. SLAM method 2320 may include outputting 2350 GNSS particle filter SLAM estimated position and 3-D map.

Figure 24:
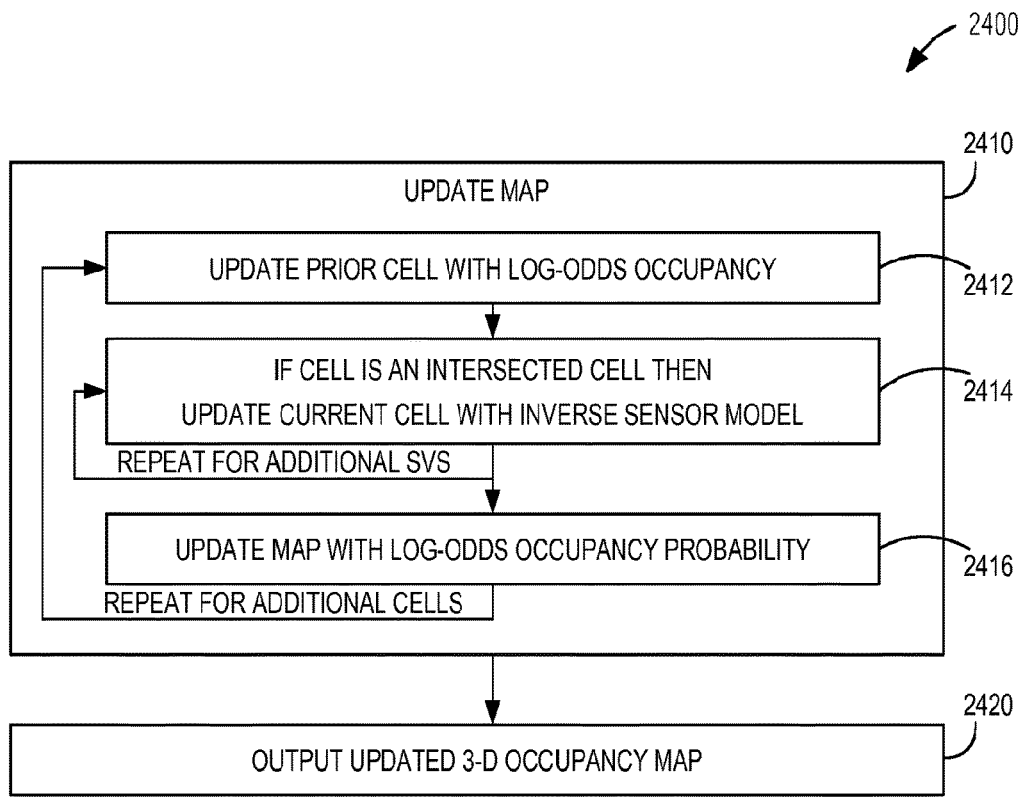
FIG. 24 is a block diagram of a map update method, according to an embodiment, according to an example embodiment.

FIG. 24 is a block diagram of a map update method 2400, according to an embodiment. In one embodiment, map update method 2400 may include updating 2412 prior cell with log-odds occupancy. Map update method 2400 may test if the cell is an intersected cell 2414, and if so, method 2400 may update the current cell with an inverse sensor model. The cell test 2414 may be repeated for all satellites. Map update method 2400 may update 2416 the map with log-odds occupancy probability, which may be repeated for all cells. Map update method 2400 may output an updated 3-D occupancy map.

Figure 25:
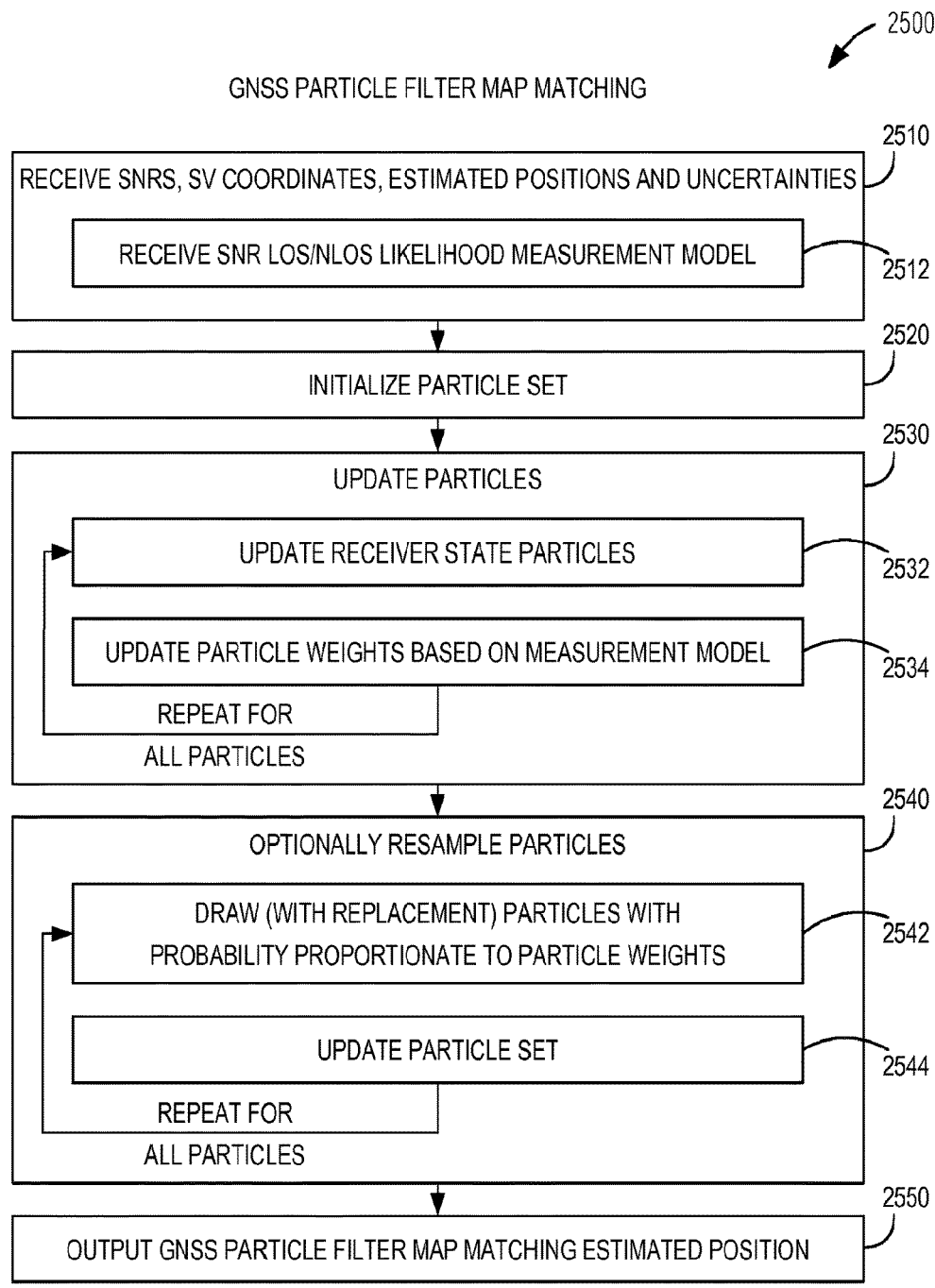
FIG. 25 is a block diagram of a GNSS map matching method, according to an embodiment, according to an example embodiment.

FIG. 25 is a block diagram of a GNSS map matching method 2500, according to an embodiment. In one embodiment, SLAM method 2520 may include receiving 2510 GNSS data. Input GNSS data may include receiving multiple predicted satellite coordinates, receiving multiple measured signal-to-noise ratio (SNR) values, or receiving multiple estimated receiver locations. Input GNSS data may also include multiple prior map occupancy probabilities or multiple uncertainty values. Receiving 2510 input GNSS data may also include receiving 2512 an SNR measurement model. The SNR measurement model may describe an expected relationship between multiple SNR measurements and multiple LOS/NLOS likelihoods.

SLAM method 2520 may include initialization 2520 of a particle set. SLAM method 2520 may include updating 2530 particles. Updating 2530 particles may include updating 2532 receiver state particles. Updating 2530 particles may also include updating 2534 particle weights based on a measurement model. Updating 2530 particles may be repeated for all particles.

SLAM method 2520 may include resampling 2540 particles. Resampling 2540 particles may include drawing 2542 particles. Drawing 2542 particles may include drawing particles with probability proportionate to particle weights, and may include drawing with replacement. Resampling 2540 particles may include updating 2544 the particle set. Resampling 2540 particles may be repeated for all particles. SLAM method 2520 may include outputting 2550 GNSS particle filter SLAM estimated position and 3-D map.

Figure 26:
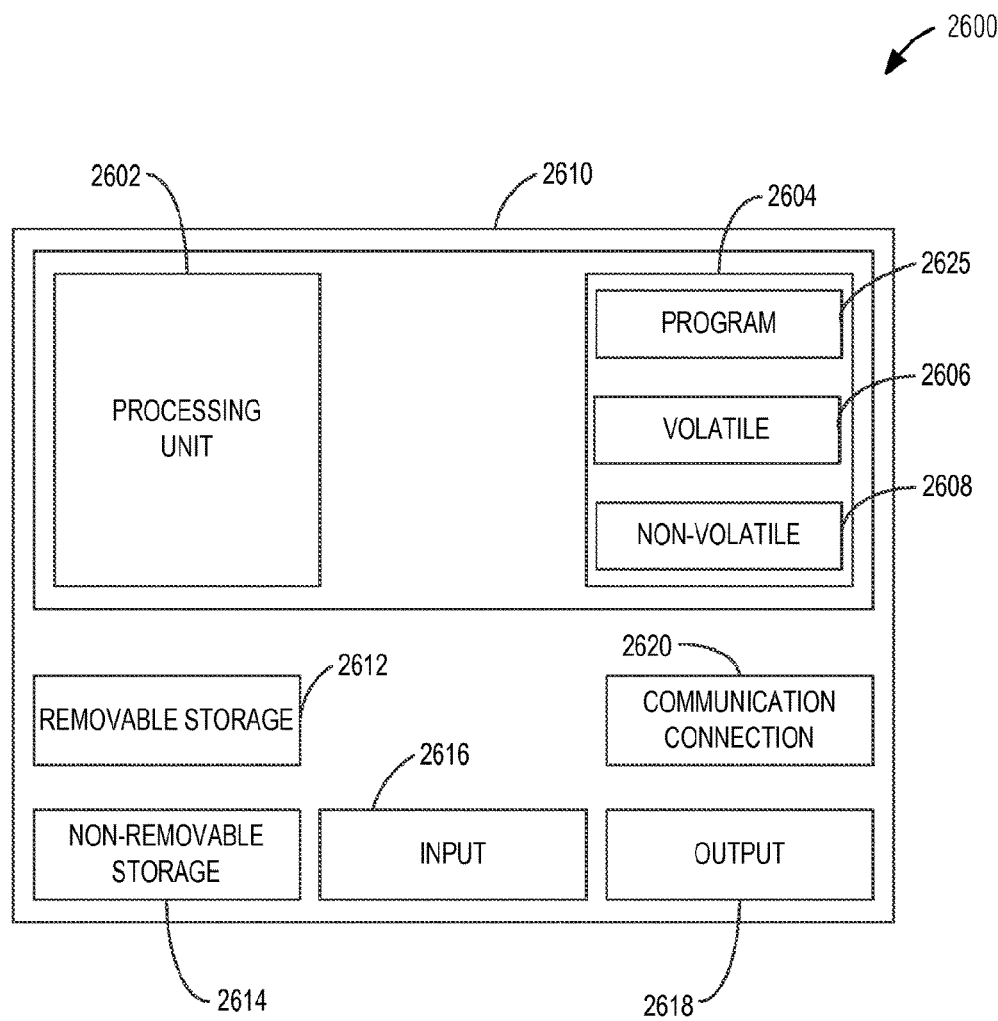
FIG. 26 is a block diagram of a computing device, according to an example embodiment.

FIG. 26 is a block diagram of a computing device 2600, according to an embodiment. In one embodiment, multiple such computer systems are used in a distributed network to implement multiple components in a transaction-based environment. An object-oriented, service-oriented, or other architecture may be used to implement such functions and communicate between the multiple systems and components. In some embodiments, the computing device of FIG. 26 is an example of a client device that may invoke methods described herein over a network. In other embodiments, the computing device is an example of a computing device that may be included in or connected to a motion interactive video projection system, as described elsewhere herein. In some embodiments, the computing device of FIG. 26 is an example of one or more of the personal computer, smartphone, tablet, or various servers.

One example computing device in the form of a computer 2610, may include a processing unit 2602, memory 2604, removable storage 2612, and non-removable storage 2614. Although the example computing device is illustrated and described as computer 2610, the computing device may be in different forms in different embodiments. For example, the computing device may instead be a smartphone, a tablet, or other computing device including the same or similar elements as illustrated and described with regard to FIG. 26. Further, although the various data storage elements are illustrated as part of the computer 2610, the storage may include cloud-based storage accessible via a network, such as the Internet.

Returning to the computer 2610, memory 2604 may include volatile memory 2606 and non-volatile memory 2608. Computer 2610 may include or have access to a computing environment that includes a variety of computer-readable media, such as volatile memory 2606 and non-volatile memory 2608, removable storage 2612 and non-removable storage 2614. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 2610 may include or have access to a computing environment that includes input 2616, output 2618, and a communication connection 2620. The input 2616 may include one or more of a touchscreen, touchpad, mouse, keyboard, camera, and other input devices. The computer may operate in a networked environment using a communication connection 2620 to connect to one or more remote computers, such as database servers, web servers, and other computing device. An example remote computer may include a personal computer (PC), server, router, network PC, a peer device or other common network node, or the like. The communication connection 2620 may be a network interface device such as one or both of an Ethernet card and a wireless card or circuit that may be connected to a network. The network may include one or more of a Local Area Network (LAN), a Wide Area Network (WAN), the Internet, and other networks.

Computer-readable instructions stored on a computer-readable medium are executable by the processing unit 2602 of the computer 2610. A hard drive (magnetic disk or solid state), CD-ROM, and RAM are some examples of articles including a non-transitory computer-readable medium. For example, various computer programs 2625 or apps, such as one or more applications and modules implementing one or more of the methods illustrated and described herein or an app or application that executes on a mobile device or is accessible via a web browser, may be stored on a non-transitory computer-readable medium.

ADDITIONAL NOTES & EXAMPLE EMBODIMENTS

Example 1 is a probabilistic global navigation satellite system (GNSS) method, the method comprising: receiving an input GNSS data; generating a navigation output based on a probabilistic simultaneous localization and mapping (SLAM); and storing, in a tangible storage medium, the navigation output.

In Example 2, the subject matter of Example 1 optionally includes wherein: generating the navigation output based on the probabilistic SLAM includes determining mapping estimates for a plurality of 3-D locations within a 3-D occupancy map; and storing the navigation output includes storing the plurality of 3-D locations within the 3-D occupancy map.

In Example 3, the subject matter of any one or more of Examples 1-2 optionally include wherein: receiving the input GNSS data includes receiving GNSS data corresponding to a plurality of GNSS users; generating the navigation output based on the probabilistic SLAM includes determining a plurality of location estimates, the plurality of location estimates corresponding to the plurality of GNSS users; and storing the navigation output includes storing the plurality of location estimates.

In Example 4, the subject matter of any one or more of Examples 1-3 optionally include wherein receiving the input GNSS data includes: receiving a plurality of predicted satellite coordinates; receiving a plurality of measured signal-to-noise ratio (SNR) values; and receiving a plurality of estimated receiver locations.

In Example 5, the subject matter of any one or more of Examples 1-4 optionally include wherein generating the navigation output based on the probabilistic SLAM includes generating the navigation output based on belief propagation.

In Example 6, the subject matter of Example 5 optionally includes wherein generating the navigation output based on the probabilistic SLAM includes: constructing a Bayesian network factor graph, the Bayesian network factor graph including a plurality of Bayesian network factor graph nodes; and determining mapping estimates for a plurality of 3-D locations within a 3-D occupancy map, the determining mapping estimates including an application of belief propagation to pass messages between Bayesian network factor graph nodes.

In Example 7, the subject matter of any one or more of Examples 5-6 optionally include wherein generating the navigation output is based on a plurality of prior map occupancy probabilities.

In Example 8, the subject matter of any one or more of Examples 5-7 optionally include wherein receiving the input GNSS data further includes receiving a plurality of GNSS receiver position uncertainty values.

In Example 9, the subject matter of any one or more of Examples 5-8 optionally include wherein generating the navigation output is based on an SNR measurement model, the SNR measurement model describing an expected relationship between a plurality of SNR measurements and a plurality of LOS/NLOS likelihoods.

In Example 10, the subject matter of any one or more of Examples 5-9 optionally include wherein constructing the Bayesian network factor graph includes: tracing a plurality of rays through a plurality of voxels within a volumetric map, each of the plurality of rays representing a GNSS satellite ray from a GNSS receiver position to each of a plurality of GNSS satellites; storing a plurality of occupancy probabilities associated with each of the plurality of voxels within the volumetric map, each of the plurality of occupancy probabilities indicating a likelihood that each of the plurality of voxels is occupied by an obstruction; and associating a line-of-sight/non-line-of-sight (LOS/NLOS) probability with each of the plurality of rays.

In Example 11, the subject matter of any one or more of Examples 5-10 optionally include wherein constructing the Bayesian network factor graph further includes sampling a plurality of particles for a plurality of GNSS receiver positions.

In Example 12, the subject matter of any one or more of Examples 5-11 optionally include wherein: the Bayesian network factor graph nodes includes a plurality of map state variable nodes and a plurality of SNR likelihood factor nodes; and the application of belief propagation includes passing messages between the plurality of map state variable nodes and the plurality of SNR likelihood factor nodes.

In Example 13, the subject matter of Example 12 optionally includes wherein passing messages is conducted according to a message passing schedule.

In Example 14, the subject matter of Example 13 optionally includes wherein the message passing schedule is asynchronous.

In Example 15, the subject matter of any one or more of Examples 13-14 optionally include wherein the message passing schedule is synchronous.

In Example 16, the subject matter of any one or more of Examples 5-15 optionally include wherein determining mapping estimates includes holding position estimates constant.

In Example 17, the subject matter of any one or more of Examples 5-16 optionally include wherein: the Bayesian network factor graph nodes further include a plurality of position variable nodes; and the application of belief propagation includes passing messages between the plurality of position variable nodes and the plurality of SNR likelihood factor nodes.

In Example 18, the subject matter of any one or more of Examples 6-17 optionally include wherein: the Bayesian network factor graph nodes further include a plurality of motion variable nodes; and the application of belief propagation includes passing messages between the plurality of motion variable nodes and the plurality of position variable nodes.

In Example 19, the subject matter of any one or more of Examples 6-18 optionally include determining a sequence of improved position estimates, the determining of the sequence of improved position estimates including Bayesian shadow matching.

In Example 20, the subject matter of Example 19 optionally includes wherein Bayesian shadow matching includes applying a particle filter while holding map estimates constant.

In Example 21, the subject matter of any one or more of Examples 19-20 optionally include wherein determining updated position estimates includes passing messages between the plurality of position variable nodes and the plurality of SNR likelihood factor nodes.

In Example 22, the subject matter of any one or more of Examples 19-21 optionally include wherein storing the navigation output includes storing the sequence of improved position estimates.

In Example 23, the subject matter of any one or more of Examples 1-22 optionally include wherein generating the navigation output based on the probabilistic SLAM includes: updating a plurality of receiver state particles; updating a plurality of particle weights, wherein updating the plurality of particle weights is based on a measurement model; updating a plurality of map particles, wherein updating the plurality of map particles includes: updating a plurality of prior cells with a log-odds occupancy probability; updating a current cell with an inverse sensor model when the current cell is associated with an intersected cell; updating a 3-D occupancy map with the log-odds occupancy probability; and outputting the 3-D occupancy map.

In Example 24, the subject matter of Example 23 optionally includes wherein generating the navigation output based on the probabilistic SLAM includes: resampling the plurality of receiver state particles; drawing a plurality of resampled particles; and updating the plurality of map particles.

In Example 25, the subject matter of any one or more of Examples 3-24 optionally include wherein generating the navigation output includes: updating a plurality of receiver state particles; updating a plurality of particle weights, wherein updating the plurality of particle weights is based on a measurement model; updating a plurality of map particles, wherein updating the plurality of map particles includes: updating a plurality of prior cells with a log-odds occupancy probability; updating a current cell with an inverse sensor model when the current cell is associated with an intersected cell; updating a 3-D occupancy map with the log-odds occupancy probability; and outputting the 3-D occupancy map.

In Example 26, the subject matter of Example 25 optionally includes wherein generating the navigation output includes: resampling the plurality of receiver state particles; drawing a plurality of resampled particles; and updating the plurality of map particles.

Example 27 is a non-transitory computer readable medium, with instructions stored thereon, which when executed by the at least one processor cause a computing device to perform data processing activities of any one of the methods of Examples 1-26.

Example 28 is an apparatus comprising means for performing any of the methods of Examples 1-26.

Example 29 is a device comprising: at least one processor; at least one memory; and an instruction set, stored in the at least one memory and executable by the at least one processor to perform data processing activities, the data processing activities comprising: receiving an input global navigation satellite system (GNSS) data; generating a navigation output based on probabilistic simultaneous localization and mapping (SLAM); and storing, in the least one memory, the navigation output.

In Example 30, the subject matter of Example 29 optionally includes wherein: generating the navigation output based on the probabilistic SLAM includes determining mapping estimates for a plurality of 3-D locations within a 3-D occupancy map; and storing the navigation output includes storing the plurality of 3-D locations within the 3-D occupancy map.

In Example 31, the subject matter of any one or more of Examples 29-30 optionally include wherein receiving the input GNSS data includes receiving GNSS data corresponding to a plurality of GNSS users; generating the navigation output based on the probabilistic SLAM includes determining a plurality of location estimates, the plurality of location estimates corresponding to the plurality of GNSS users; and storing the navigation output includes storing the plurality of location estimates.

In Example 32, the subject matter of any one or more of Examples 29-31 optionally include wherein generating the navigation output based on the probabilistic SLAM includes generating the navigation output based on belief propagation.

In Example 33, the subject matter of any one or more of Examples 29-32 optionally include wherein generating the navigation output based on the probabilistic SLAM includes: constructing a Bayesian network factor graph, the Bayesian network factor graph including a plurality of Bayesian network factor graph nodes; and determining mapping estimates for a plurality of 3-D locations within a 3-D occupancy map, the determining mapping estimates including an application of belief propagation to pass messages between Bayesian network factor graph nodes.

In Example 34, the subject matter of Example 33 optionally includes wherein storing the navigation output includes storing the plurality of 3-D locations within the 3-D occupancy map.

In Example 35, the subject matter of any one or more of Examples 33-34 optionally include wherein receiving the input GNSS data includes: receiving a plurality of predicted satellite coordinates; receiving a plurality of measured signal-to-noise ratio (SNR) values; and receiving a plurality of estimated receiver locations.

In Example 36, the subject matter of Example 35 optionally includes wherein receiving the input GNSS data further includes receiving a plurality of prior map occupancy probabilities.

In Example 37, the subject matter of any one or more of Examples 35-36 optionally include wherein receiving the input GNSS data further includes receiving a plurality of GNSS receiver position uncertainty values.

In Example 38, the subject matter of any one or more of Examples 35-37 optionally include wherein receiving the input GNSS data further includes receiving an SNR measurement model, the SNR measurement model describing an expected relationship between a plurality of SNR measurements and a plurality of LOS/NLOS likelihoods.

In Example 39, the subject matter of any one or more of Examples 33-38 optionally include wherein constructing the Bayesian network factor graph includes: tracing a plurality of rays through a plurality of voxels within a volumetric map, each of the plurality of rays representing a GNSS satellite ray from a GNSS receiver position to each of a plurality of GNSS satellites; storing a plurality of occupancy probabilities associated with each of the plurality of voxels within the volumetric map, each of the plurality of occupancy probabilities indicating a likelihood that each of the plurality of voxels is occupied by an obstruction; and associating a line-of-sight/non-line-of-sight (LOS/NLOS) probability with each of the plurality of rays.

In Example 40, the subject matter of Example 39 optionally includes wherein storing the navigation output includes storing each of the plurality of occupancy probabilities.

In Example 41, the subject matter of any one or more of Examples 33-40 optionally include wherein constructing the Bayesian network factor graph further includes sampling a plurality of particles for a plurality of GNSS receiver positions.

In Example 42, the subject matter of any one or more of Examples 33-41 optionally include wherein: the Bayesian network factor graph nodes includes a plurality of map state variable nodes and a plurality of SNR likelihood factor nodes; and the application of belief propagation includes passing messages between the plurality of map state variable nodes and the plurality of SNR likelihood factor nodes.

In Example 43, the subject matter of Example 42 optionally includes wherein passing messages is conducted according to a message passing schedule.

In Example 44, the subject matter of any one or more of Examples 42-43 optionally include wherein the message passing schedule is asynchronous.

In Example 45, the subject matter of any one or more of Examples 42-44 optionally include wherein the message passing schedule is synchronous.

In Example 46, the subject matter of any one or more of Examples 29-45 optionally include wherein determining mapping estimates includes holding position estimates constant.

In Example 47, the subject matter of any one or more of Examples 33-46 optionally include wherein determining mapping estimates continues until convergence on an output within a selected threshold.

In Example 48, the subject matter of any one or more of Examples 33-47 optionally include wherein determining mapping estimates continues for a selected determining duration.

In Example 49, the subject matter of any one or more of Examples 33-48 optionally include wherein: the Bayesian network factor graph nodes further include a plurality of position variable nodes; and the application of belief propagation includes passing messages between the plurality of position variable nodes and the plurality of SNR likelihood factor nodes.

In Example 50, the subject matter of any one or more of Examples 33-49 optionally include wherein: the Bayesian network factor graph nodes further include a plurality of motion variable nodes; and the application of belief propagation includes passing messages between the plurality of motion variable nodes and the plurality of position variable nodes.

In Example 51, the subject matter of any one or more of Examples 33-50 optionally include determining a sequence of improved position estimates, the determining of the sequence of improved position estimates including Bayesian shadow matching.

In Example 52, the subject matter of Example 51 optionally includes wherein Bayesian shadow matching includes applying a particle filter while holding map estimates constant.

In Example 53, the subject matter of any one or more of Examples 51-52 optionally include wherein determining updated position estimates includes passing messages between the plurality of position variable nodes and the plurality of SNR likelihood factor nodes.

In Example 54, the subject matter of any one or more of Examples 51-53 optionally include wherein storing the navigation output includes storing the sequence of improved position estimates.

Example 55 is a probabilistic global navigation satellite system (GNSS) method, the method comprising: receiving an input GNSS data; generating a navigation output based on a Bayesian shadow matching; and storing, in a tangible storage medium, the navigation output.

In Example 56, the subject matter of Example 55 optionally includes wherein generating the navigation output based on the probabilistic SLAM includes generating the navigation output based on belief propagation.

In Example 57, the subject matter of Example 56 optionally includes wherein generating the navigation output based on the probabilistic SLAM includes: constructing a Bayesian network factor graph, the Bayesian network factor graph including a plurality of Bayesian network factor graph nodes; and determining mapping estimates for a plurality of 3-D locations within a 3-D occupancy map, the determining mapping estimates including an application of belief propagation to pass messages between Bayesian network factor graph nodes.

In Example 58, the subject matter of any one or more of Examples 56-57 optionally include wherein constructing the Bayesian network factor graph includes: tracing a plurality of rays through a plurality of voxels within a volumetric map, each of the plurality of rays representing a GNSS satellite ray from a GNSS receiver position to each of a plurality of GNSS satellites; storing a plurality of occupancy probabilities associated with each of the plurality of voxels within the volumetric map, each of the plurality of occupancy probabilities indicating a likelihood that each of the plurality of voxels is occupied by an obstruction; and associating a line-of-sight/non-line-of-sight (LOS/NLOS) probability with each of the plurality of rays.

In Example 59, the subject matter of any one or more of Examples 56-58 optionally include wherein constructing the Bayesian network factor graph further includes sampling a plurality of particles for a plurality of GNSS receiver positions.

In Example 60, the subject matter of any one or more of Examples 56-59 optionally include wherein: the Bayesian network factor graph nodes includes a plurality of map state variable nodes and a plurality of SNR likelihood factor nodes; and the application of belief propagation includes passing messages between the plurality of map state variable nodes and the plurality of SNR likelihood factor nodes.

In Example 61, the subject matter of any one or more of Examples 56-60 optionally include wherein: the Bayesian network factor graph nodes further include a plurality of position variable nodes; and the application of belief propagation includes passing messages between the plurality of position variable nodes and the plurality of SNR likelihood factor nodes.

In Example 62, the subject matter of any one or more of Examples 57-61 optionally include wherein: the Bayesian network factor graph nodes further include a plurality of motion variable nodes; and the application of belief propagation includes passing messages between the plurality of motion variable nodes and the plurality of position variable nodes.

In Example 63, the subject matter of any one or more of Examples 58-62 optionally include wherein Bayesian shadow matching includes determining a sequence of improved position estimates.

In Example 64, the subject matter of Example 63 optionally includes wherein Bayesian shadow matching includes applying a particle filter while holding map estimates constant.

Example 65 is a non-transitory computer readable medium, with instructions stored thereon, which when executed by the at least one processor cause a computing device to perform data processing activities of any one of the methods of Examples 55-64.

Example 66 is an apparatus comprising means for performing any of the methods of Examples 55-64.

Each of these non-limiting examples can stand on its own, or can be combined in various permutations or combinations with one or more of the other examples.

Conventional terms in the fields of GNSS analysis have been used herein. The terms are known in the art and are provided only as a non-limiting example for convenience purposes. Accordingly, the interpretation of the corresponding terms in the claims, unless stated otherwise, is not limited to any particular definition. Thus, the terms used in the claims should be given their broadest reasonable interpretation.

Although specific embodiments have been illustrated and described herein, it will be appreciated by those of ordinary skill in the art that any arrangement that is calculated to achieve the same purpose may be substituted for the specific embodiments shown. Many adaptations will be apparent to those of ordinary skill in the art. Accordingly, this application is intended to cover any adaptations or variations.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer-readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read-only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure and is submitted with the understanding that it will not be used to interpret or limit the scope or meaning of the claims. In addition, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the embodiments should be determined with reference to the appended claims, along with the full scope of equivalents to which such claims are entitled.

What is claimed is:

1. A probabilistic global navigation satellite system (GNSS) method, the method comprising:
    receiving input GNSS data from one or more GNSS data devices, wherein receiving the input GNSS data includes:
        receiving a plurality of predicted satellite coordinates;
        receiving a plurality of measured signal-to-noise ratio (SNR) values; and
        receiving a plurality of estimated receiver locations
    generating a navigation output based on a probabilistic simultaneous localization and mapping (SLAM) that utilizes ray tracing between the plurality of estimated receiver locations and the plurality of predicted satellite coordinates along with one or more of the plurality of measured SNR values to determine mapping estimates for a plurality of 3-D locations within a 3-D occupancy map; and
    storing, in a tangible storage medium, the navigation output, which includes the plurality of 3-D locations within the 3-D occupancy map.

2. The probabilistic GNSS method of claim 1, wherein the probabilistic SLAM assigns line-of-sight (LOS) or non-LOS (NLOS) likelihoods for each ray trace between the plurality of receiver locations and the plurality of satellite coordinates based on the measured SNR values associated with each ray trace.

3. The probabilistic GNSS method of claim 1, wherein:
    receiving the input GNSS data includes receiving GNSS data corresponding to a plurality of GNSS users;
    generating the navigation output based on the probabilistic SLAM includes determining a plurality of location estimates, the plurality of location estimates corresponding to the plurality of GNSS users; and
    storing the navigation output includes storing the plurality of location estimates.

4. The probabilistic GNSS method of claim 1, wherein generating the navigation output based on the probabilistic SLAM includes generating the navigation output based on belief propagation.

5. The probabilistic GNSS method of claim 1, wherein generating the navigation output is based on a plurality of prior map occupancy probabilities.

6. The probabilistic GNSS method of claim 1, wherein receiving the input GNSS data further includes receiving a plurality of GNSS receiver position uncertainty values.

7. The probabilistic GNSS method of claim 1, wherein generating the navigation output is based on an SNR measurement model, the SNR measurement model describing an expected relationship between a plurality of SNR measurements and a plurality of LOS/NLOS likelihoods.

8. A probabilistic global navigation satellite system (GNSS) method, the method comprising:

receiving an input GNSS data from one or more GNSS data devices;
generating a navigation output based on a probabilistic simultaneous localization and mapping (SLAM); wherein generating the navigation output based on the probabilistic SLAM includes:
updating a plurality of receiver state particles;
updating a plurality of particle weights, wherein updating the plurality of particle weights is based on a measurement model;
updating a plurality of map particles, wherein updating the plurality of map particles includes;
updating a plurality of prior cells with a log-odds occupancy probability;
updating a current cell with an inverse sensor model when the current cell is associated with an intersected cell;
updating a 3-D occupancy map with the log-odds occupancy probability; and
outputting the 3-D occupancy map; and
storing, in a tangible storage medium, the navigation output.

9. A device comprising:
at least one processor;
at least one memory; and
an instruction set, stored in the at least one memory and executable by the at least one processor to perform data processing activities, the data processing activities comprising:
receiving an input global navigation satellite system (GNSS) data;
generating a navigation output based on probabilistic simultaneous localization and mapping (SLAM), wherein generating the navigation output based on probabilistic SLAM includes:
constructing a Bayesian network factor graph, the Bayesian network factor graph including a plurality of Bayesian network factor graph nodes; and
determining mapping estimates for a plurality of 3-D locations within a 3-D occupancy map, the determining of mapping estimates including an application of belief propagation to pass messages between Bayesian network factor graph nodes; and
storing, in the least one memory, the navigation output.

10. The device of claim 9, wherein:
generating the navigation output based on the probabilistic SLAM includes determining mapping estimates for a plurality of 3-D locations within a 3-D occupancy map; and
storing the navigation output includes storing the plurality of 3-D locations within the 3-D occupancy map.

11. The device of claim 9, wherein
receiving the input GNSS data includes receiving GNSS data corresponding to a plurality of GNSS users;
generating the navigation output based on the probabilistic SLAM includes determining a plurality of location estimates, the plurality of location estimates corresponding to the plurality of GNSS users; and
storing the navigation output includes storing the plurality of location estimates.

12. The device of claim 9, wherein constructing the Bayesian network factor graph includes:
tracing a plurality of rays through a plurality of voxels within a volumetric map, each of the plurality of rays representing a GNSS satellite ray from a GNSS receiver position to each of a plurality of GNSS satellites;
storing a plurality of occupancy probabilities associated with each of the plurality of voxels within the volumetric map, each of the plurality of occupancy probabilities indicating a likelihood that each of the plurality of voxels is occupied by an obstruction; and
associating a line-of-sight/non-line-of-sight (LOS/NLOS) probability with each of the plurality of rays.

13. A probabilistic global navigation satellite system (GNSS) method, the method comprising:
receiving an input GNSS data from one or more GNSS data devices;
generating a navigation output based on a Bayesian shadow matching,
wherein generating the navigation output based on the Bayesian shadow matching includes:
constructing a Bayesian network factor graph, the Bayesian network factor graph including a plurality of Bayesian network factor graph nodes; and
determining mapping estimates for a plurality of 3-D locations within a 3-D occupancy map, the determining mapping estimates including an application of belief propagation to pass messages between Bayesian network factor graph nodes; and
storing, in a tangible storage medium, the navigation output.

14. The probabilistic GNSS method of claim 13, wherein generating the navigation output based on the probabilistic SLAM includes generating the navigation output based on belief propagation.

15. The probabilistic GNSS method of claim 13, wherein constructing the Bayesian network factor graph includes:
tracing a plurality of rays through a plurality of voxels within a volumetric map, each of the plurality of rays representing a GNSS satellite ray from a GNSS receiver position to each of a plurality of GNSS satellites;
storing a plurality of occupancy probabilities associated with each of the plurality of voxels within the volumetric map, each of the plurality of occupancy probabilities indicating a likelihood that each of the plurality of voxels is occupied by an obstruction; and
associating a line-of-sight/non-line-of-sight (LOS/NLOS) probability with each of the plurality of rays.

16. The probabilistic GNSS method of claim 13, wherein Bayesian shadow matching includes determining a sequence of improved position estimates.

17. The probabilistic GNSS method of claim 13, wherein Bayesian shadow matching includes applying a particle filter while holding map estimates constant.

* * * * *